US006971026B1

(12) United States Patent
Fujiyama et al.

(10) Patent No.: US 6,971,026 B1
(45) Date of Patent: Nov. 29, 2005

(54) METHOD AND APPARATUS FOR EVALUATING SECURITY AND METHOD AND APPARATUS FOR SUPPORTING THE MAKING OF SECURITY COUNTERMEASURE

(75) Inventors: Tatsuya Fujiyama, Yokohama (JP); Makoto Kayashima, Yamato (JP); Yasuhiko Nagai, Tokyo (JP); Mitsuhiro Tsunoda, Kawasaki (JP); Tomoaki Yamada, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 962 days.

(21) Appl. No.: 09/628,108

(22) Filed: Jul. 27, 2000

(30) Foreign Application Priority Data

Sep. 29, 1999 (JP) ................................. 11-277265

(51) Int. Cl.[7] .......................... G06F 11/30; G06F 17/30; G06F 17/60; G06F 15/16
(52) U.S. Cl. .......................... 713/200; 705/400; 707/1; 715/736; 719/224
(58) Field of Search ............................... 713/200, 201; 709/223, 224, 200; 705/400; 707/1, 3, 6, 707/100, 102, 200, 203; 345/700, 733–736; 715/700, 733–736; 717/168–178

(56) References Cited

U.S. PATENT DOCUMENTS 6,574,737 B1 * 6/2003 Kingsford et al. .......... 713/201
6,631,473 B2 * 10/2003 Townsend ................... 713/201
2003/0056116 A1 * 3/2003 Bunker et al. .............. 713/201
2004/0010709 A1 * 1/2004 Baudoin et al. ............ 713/201

FOREIGN PATENT DOCUMENTS

JP 06-230957 8/1994

OTHER PUBLICATIONS

"Internet Scanner User Guide", 1998, Internet Security Systems, Inc., Version 5.2, p. 1-150.*
C.C. Wood, Information Security Policies Made Easy, Version 6, Copyright 1997, Table of Content and p. 33.
"Common Criteria for Information Technology Security Evaluation", Aug. 1999, Version 2.1, ISO/IEC 15408-1.

* cited by examiner

*Primary Examiner*—Christopher Revak
(74) *Attorney, Agent, or Firm*—Mattingly, Stanger, Malur & Brundidge, P.C.

(57) ABSTRACT

A security support and evaluation system in accordance with the present invention accepts from an operator via an input unit 16, a first specification of a system to be evaluated and a second specification of each of the components constituting the system, and then retrieves data from a security countermeasure database 131 stored in an external storage unit 13 and reads out security countermeasures to be executed to each of the components of the specified system to be evaluated, and then displays on a display unit 17, the security countermeasures read out in correspondence with each of the components of the specified system to be evaluated, and then accepts from the operator via the input unit 16, information whether or not each of the security countermeasures is executed, and thereafter evaluates the state of security based on the information and displays evaluation results on the display unit 17.

8 Claims, 21 Drawing Sheets

FIG. 2

INTERNET CONNECTION SYSTEM (NO. 1)

| 201 | 202 | 203 | 204 | 205₁ | 205₂ | 206₁ | 206₂ | 206₃ | 207 | 208 |
|---|---|---|---|---|---|---|---|---|---|---|
| COUNTERMEASURE TYPE | SECURITY COUNTERMEASURE | ASSUMED THREAT | CC FUNCTIONAL REQUIREMENT | LINE OF BUSINESS A CRITERION | LINE OF BUSINESS B CRITERION | WWW SERVER | CLIENT | BORDER ROUTER | FACILITY | OPERATION |
| MANAGEMENT OF ACCESS AUTHORIZATION | SET THE MANAGER OF AN ACCESS AUTHORIZATION | ILLEGAL USE | | ◎ | ◎ | | | | | L2.C2.R4 |
| MANAGEMENT OF ACCESS AUTHORIZATION | SET A PASSWORD ON AN INDIVIDUAL BASIS | ILLEGAL USE | FMT_MSA.1 | | | L3.C2.R2 | L3.C2.R2 | | | |
| MANAGEMENT OF ACCESS AUTHORIZATION | SET AN ACCESS AUTHORIZATION SUCH THAT THE STATE OF SETTING CAN BE CHECKED AT ANY TIME | ILLEGAL USE | FMT_MSA.1 FMT_MTD.1 | | | L2.C2.R3 | L2.C2.R3 | | | |
| MANAGEMENT OF ACCESS AUTHORIZATION | LIMIT AN ACCESS TO AN PRIVILEGED USER | LEAKAGE OF INFORMATION | FDP_ACF.1 FDP_ACC.2 FIA_UAD.1 | ◎ | | L1.C1.R3 | L3.C1.R3 | | | |
| MANAGEMENT OF ACCESS AUTHORIZATION | LIMIT A PERSON CAPABLE OF USING A MANAGEMENT UTILITY | LEAKAGE OF INFORMATION | FDP_ACC.1 FDP_ACF.1 | | | L1.C1.R3 | L1.C1.R3 | L1.C1.R3 | | |
| ... | ... | ... | ... | ... | ... | ... | ... | ... | ... | ... |
| IDENTIFICATION AND AUTHENTICATION | LIMIT A TERMINAL CAPABLE OF BECOMING A PRIVILEGED USER BY A REMOTE ACCESS | ILLEGAL USE | FIA_UAU.2 FIA_UID.1 | ◎ | | L3.C3.R3 | | L2.C4.R3 | | |
| IDENTIFICATION AND AUTHENTICATION | CHECK A PERSON BY AN IP ADDRESS | ILLEGAL USE | | | | L2.C2.R3 | L1.C2.R3 | | | |
| IDENTIFICATION AND AUTHENTICATION | DO NOT DISPLAY VARIOUS KINDS OF INFORMATION WHEN AUTHENTICATION IS NOT SUCCESSFUL | ILLEGAL USE | FIA_AFL.1 FIA_UAD.7 | | | L1.C1.R2 | L1.C2.R2 | L1.C2.R2 | | |
| IDENTIFICATION AND AUTHENTICATION | LOCK A USER ID WHEN IT IS NOT AUTHENTICATED ONE TIME | ILLEGAL USE | FIA_AFL.1 | | | L2.C3.R3 | | L1.C3.R3 | | |
| ... | ... | ... | ... | ... | ... | ... | ... | ... | ... | ... |

SECURITY LEVEL:
L1: NORMAL, L2: STRONG, L3: STRONGEST

ANNUAL COST REQUIRED:
C1: LESS THAN 100 THOUSAND  C2: LESS THAN ONE MILLION
C3: LESS THAN 5 MILLION  C4: LESS THAN 10 MILLION
C5: NOT LESS THAN 10 MILLION

ANNUAL REMAINING RISK:
R1: LESS THAN 100 THOUSAND  R2: LESS THAN ONE MILLION
R3: LESS THAN 5 MILLION  R4: LESS THAN 10 MILLION
R5: NOT LESS THAN 10 MILLION

FIG. 3

INTERNET CONNECTION SYSTEM (NO. 2)

| 201 | 202 | 203 | 204 | 205₁ | 205₂ | 206₁ | 206₂ | 206₃ | 207 | 208 |
|---|---|---|---|---|---|---|---|---|---|---|
| COUNTERMEASURE TYPE | SECURITY COUNTERMEASURE | ASSUMED THREAT | CC FUNCTIONAL REQUIREMENT | LINE OF BUSINESS A CRITERION | LINE OF BUSINESS B CRITERION | WWW SERVER | CLIENT | BORDER ROUTER | FACILITY | OPERATION |
| COUNTERMEASURE AGAINST VIRUS | PERIODICALLY START A VIRUS CHECKER | TAMPERING WITH INFORMATION | | | | L3.C2.R3 | L1.C1.R3 | | | |
| COUNTERMEASURE AGAINST VIRUS | PERIODICALLY UPDATE THE DEFINITION OF A VIRUS | TAMPERING WITH INFORMATION | | | | L3.C2.R3 | L1.C1.R2 | | | |
| COUNTERMEASURE AGAINST VIRUS | SET A PORTABLE MEMORY MEDIUM SUCH AS A FD OR THE LIKE UNUSABLE | TAMPERING WITH INFORMATION | | | | L3.C1.R2 | L3.C1.R2 | | | |
| COUNTERMEASURE AGAINST VIRUS | PERIODICALLY CHECK A DEMON STARTING MECHANISM | TAMPERING WITH INFORMATION | | | | L3.C3.R3 | | | | |
| COUNTERMEASURE AGAINST VIRUS | STOP AN UNNECESSARY SERVICE | ILLEGAL USE | | | | L2.C2.R3 | L1.C2.R3 | | | |
| ... | ... | ... | ... | ⊚ | ... | ... | ... | ... | ... | ... |
| MANAGEMENT OF THE COMING AND GOING OF A PERSON INTO AND OUT OF A ROOM | LOCK AN ENTRANCE AND AN EXIT | DESTRUCTION OF COMPONENT | | | | | | | L1.C4.R4 | |
| MANAGEMENT OF THE COMING AND GOING OF A PERSON INTO AND OUT OF A ROOM | MANAGE A KEY NECESSARY TO ENTER A ROOM AT A PREDETERMINED POSITION | DESTRUCTION OF COMPONENT | | | | | | | | L2.C2.R4 |
| MANAGEMENT OF THE COMING AND GOING OF A PERSON INTO AND OUT OF A ROOM | ISSUE A LICENSE TO ENTER A ROOM | DESTRUCTION OF COMPONENT | | | | | | | | L2.C2.R4 |
| MANAGEMENT OF THE COMING AND GOING OF A PERSON INTO AND OUT OF A ROOM | SET A LEVEL FOR THE MANAGEMENT OF THE COMING OF A PERSON INTO A ROOM | DESTRUCTION OF COMPONENT | | | | | | | | L3.C3.R4 |
| ... | ... | | | | | | | | | ... |

SECURITY LEVEL:
L1: NORMAL, L2: STRONG, L3: STRONGEST

ANNUAL COST REQUIRED:
C1: LESS THAN 100 THOUSAND  C2: LESS THAN ONE MILLION
C3: LESS THAN 5 MILLION  C4: LESS THAN 10 MILLION
C5: NOT LESS THAN 10 MILLION

ANNUAL REMAINING RISK:
R1: LESS THAN 100 THOUSAND  R2: LESS THAN ONE MILLION
R3: LESS THAN 5 MILLION  R4: LESS THAN 10 MILLION
R5: NOT LESS THAN 10 MILLION

FIG. 4

AUTHENTICATION SYSTEM

| 201 | 202 | 203 | 204 | 205₁ | 205₂ | 206₁ | 206₂ | 206₃ | 207 | 208 |
|---|---|---|---|---|---|---|---|---|---|---|
| COUNTERMEASURE TYPE | SECURITY COUNTERMEASURE | ASSUMED THREAT | CC FUNCTIONAL REQUIREMENT | LINE OF BUSINESS A CRITERION | LINE OF BUSINESS B CRITERION | AUTHEN-TICATION SERVER | ENCRYP-TION UNIT | ROUTER | FACILITY | FACILITY OPERATION |
| MANAGEMENT OF AN AUTHENTICATION LICENSE | SET THE EXPIRATION DATE OF AN AUTHENTICATION LICENSE | ILLEGAL USE | FMT_SAE.1 FMT_MSA.1 | | | L1.C3.R4 | | | | |
| MANAGEMENT OF AN AUTHENTICATION LICENSE | IDENTIFY AND AUTHENTICATE A PERSON BEFORE NULLIFYING AN AUTHENTICATION LICENSE | ILLEGAL USE | FIA_UID.2 FIA_UAU.1 | | | L2.C3.R4 | L1.C3.R4 | | | |
| ⋯ | ⋯ | ⋯ | ⋯ | ⋯ | ⋯ | ⋯ | ⋯ | ⋯ | ⋯ | ⋯ |
| MANAGEMENT OF A KEY | RECORD AN ACCESS TO A KEY WHICH IS NOT ALLOWED IN AN AUDIT TRAIL | ILLEGAL USE | FAU_GEN.1 FAU_SAR.1 FAU_SAR.3 | | | | L2.C3.R5 | L1.C3.R5 | L3.C3.R5 | |
| ⋯ | ⋯ | ⋯ | ⋯ | ⋯ | ⋯ | ⋯ | ⋯ | ⋯ | ⋯ | ⋯ |
| COUNTERMEASURE AGAINST AN INTRUDER | MAKE A FIRE WALL AT A POINT CONNECTED TO AN EXTERNAL NETWORK | LEAKAGE OF INFORMATION | | | | | | | L1.C4.R5 | |
| ⋯ | ⋯ | ⋯ | ⋯ | ⋯ | ⋯ | ⋯ | ⋯ | ⋯ | ⋯ | ⋯ |
| MANAGEMENT OF THE COMING AND GOING OF A PERSON INTO AND OUT OF A ROOM | QUICKLY CHANGE AND RETRIEVE A LICENSE IN RESPONSE TO A CHANGE IN QUALIFICATION | DESTRUCTION OF COMPONENT | | | | | | | | L2.C4.R5 |
| ⋯ | ⋯ | ⋯ | ⋯ | ⋯ | ⋯ | ⋯ | ⋯ | ⋯ | ⋯ | ⋯ |

SECURITY LEVEL:
L1: NORMAL, L2: STRONG, L3: STRONGEST

ANNUAL COST REQUIRED:
C1: LESS THAN 100 THOUSAND  C2: LESS THAN ONE MILLION
C3: LESS THAN 5 MILLION  C4: LESS THAN 10 MILLION
C5: NOT LESS THAN 10 MILLION

ANNUAL REMAINING RISK:
R1: LESS THAN 100 THOUSAND  R2: LESS THAN ONE MILLION
R3: LESS THAN 5 MILLION  R4: LESS THAN 10 MILLION
R5: NOT LESS THAN 10 MILLION

FIG. 5

PLANT SYSTEM

| 201 Countermeasure Type | 202 Security Countermeasure | 203 Assumed Threat | 204 CC Functional Requirement | 205₁ Line of Business A Criterion | 205₂ Line of Business B Criterion | 206₁ Control Unit | 206₂ Management Unit | 206₃ Fire Wall | 207 Facility | 208 Operation |
|---|---|---|---|---|---|---|---|---|---|---|
| MANAGEMENT OF THE AUTHORIZATION OF OPERATING A PLANT | IDENTIFY AND AUTHENTICATE A PERSON BEFORE OPERATING A PLANT | ILLEGAL USE | FIA_UID.2 FMT_UAU.1 | | | L2.C3.R4 | L1.C3.R4 | L1.C3.R4 | | |
| MANAGEMENT OF THE AUTHORIZATION OF OPERATING A PLANT | GRANT A PRIVILEGE TO A USER IN CONSIDERATION OF A TECHNICAL LEVEL | ILLEGAL USE | FMT_MSA.1 | | | | | | | L1.C3.R4 |
| ... | ... | ... | ... | | | ...... | ...... | ...... | ...... | ...... |
| MONITORING THE OPERATION OF A PLANT | RECORD AN OPERATION WHICH IS NOT ALLOWED IN AN AUDIT TRAIL | ILLEGAL USE | FAU_GEN.1 FAU_SAR.1 FAU_SAR.3 | | | L2.C3.R5 | L1.C3.R5 | L3.C3.R5 | | |
| ... | ... | ... | ... | | ...... | ...... | ...... | ...... | ...... | ...... |
| COUNTERMEASURE AGAINST AN INTRUDER | MAKE A FIRE WALL AT A POINT CONNECTED TO AN EXTERNAL NETWORK | LEAKAGE OF INFORMATION | | | | | | | L1.C4.R5 | |
| | | | | | | | | | | |
| MANAGEMENT OF THE COMING AND GOING OF A PERSON INTO AND OUT OF A ROOM | SET A LEVEL FOR THE MANAGEMENT OF THE COMING OF A PERSON INTO A ROOM | DESTRUCTION OF COMPONENT | | | | | | | | L2.C4.R5 |
| ... | ... | ... | | | ...... | | | | | ... |

SECURITY LEVEL:
L1: NORMAL, L2: STRONG, L3: STRONGEST

ANNUAL COST REQUIRED:
C1: LESS THAN 100 THOUSAND   C2: LESS THAN ONE MILLION
C3: LESS THAN 5 MILLION   C4: LESS THAN 10 MILLION
C5: NOT LESS THAN 10 MILLION

ANNUAL REMAINING RISK:
R1: LESS THAN 100 THOUSAND   R2: LESS THAN ONE MILLION
R3: LESS THAN 5 MILLION   R4: LESS THAN 10 MILLION
R5: NOT LESS THAN 10 MILLION

FIG. 8

OBJECTIVE SYSTEM

● INTERNET CONNECTION SYSTEM

○ AUTHENTICATION SYSTEM

○ PLANT SYSTEM

| OK | CLOSE |

FIG. 12

SETTING OF TARGET LEVEL

● NUMBER OF EXECUTED SECURITY COUNTERMEASURE   ○ LINE OF BUSINESS A CRITERION   910

TARGET VALUE [ 80 ] % OR MORE   ○ LINE OF BUSINESS B CRITERION

911
○ REQUIRED COST  TARGET VALUE < [       ] MILLION YEN / YEAR

912
○ REMAINING RISK  TARGET VALUE < [       ] MILLION YEN / YEAR

[ OK ]  [ CLOSE ]

FIG. 18

| COUNTERMEASURE DB (OBJECTIVE SYSTEM) | DB MANAGEMENT UNIT ADDRESS |
|---|---|
| COUNTERMEASURE $DB_1$ (INTERNET CONNECTION SYSTEM) | *,*,, |
| COUNTERMEASURE $DB_2$ (AUTHENTICATION SYSTEM) | *,*,, |
| COUNTERMEASURE $DB_3$ (PLANT SYSTEM) | *,*,, |
| ⋮ | ⋮ |
| COUNTERMEASURE $DB_n$ (* SYSTEM) | *,*,,** |

METHOD AND APPARATUS FOR EVALUATING SECURITY AND METHOD AND APPARATUS FOR SUPPORTING THE MAKING OF SECURITY COUNTERMEASURE

This application claims priority from Japanese Patent Application Reference No. 11-277265, filed Sep. 29, 1999, the entire content of which is incorporated herein by reference for all purposes.

BACKGROUND OF THE INVENTION

The present invention relates to a technology for evaluating the state of security of a system constituted by at least one component, or for supporting the making of security countermeasures specific to the system.

In the business activities of enterprises, an information system based on an Internet technology has become an important infrastructure. Also, as interest in the connection of an intra-enterprise information system to the Internet has grown, a security problem such as an illegal access to the intra-enterprise information system, the destruction of information assets by a virus, or the like has been recognized.

To protect the information system against such a security problem, an enterprise has taken individual technical measures such as the setting up of a firewall, the introduction of a software against a virus, or the like against individual security problems. However, in recent years, it has been desired that security countermeasures specific to the objective information system be taken in a comprehensive manner by analyzing a threat to the entire information system and by evaluating the state of security of the information system and by making a policy of countermeasures to be taken in the future on the basis of the results of evaluation.

Against this backdrop, Common Criteria for Information Technology Security Evaluation (IS 15408) was standardized in June, 1999 as a frame for systematically evaluating and constructing the security of an information technology product and an information system constituted by the information technology products. Also, Information Security Policies Made Easy (ISPME), a collection of examples of security policies to be executed to individual information systems, which was written by Mr. Charles Cresson Wood, a security expert in the U.S., and is centered on the operation and management of the information systems, was published by BASELINE SOFTWARE, INC. on Jun. 10, 1997.

Also, some people have started to offer the services of evaluating the state of security of an information system and supporting the making of security countermeasures directed toward the information system based on the above-stated Common Criteria for Information Technology Security Evaluation or the collection of examples of security policies ISPME as consultant services.

SUMMARY OF THE INVENTION

When evaluating the state of security of an information system and supporting the making of security countermeasures directed toward the information system based on the above-stated Common Criteria for Information Technology Security Evaluation, it is necessary to extract from the systematically specified Common Criteria for Information Technology Security Evaluation, requirements to be applied to each component constituting an information system whose state of security is to be evaluated or toward which security countermeasures are to be made so as to make requirements specific to the information system. For this reason, any person other than an expert thoroughly familiar with the Common Criteria for Information Technology Security Evaluation and having a high level of expertise cannot carry out the work described above. Therefore, it takes much time and increases working costs to carry out the work.

Also, even when supporting the making of the security countermeasures based on the collection of examples of security policies (ISPME), it is necessary to extract from the ISPME, examples corresponding to an information system toward which security countermeasure are to be made and to make a security policy for the information system while applying the extracted examples to the actual constitution of the information system. For this reason, any person other than an expert thoroughly familiar with the correspondence between the collection of examples of security policies (ISPME) and the actual constitution of the information system and having a high level of expertise can not carry out the work. Therefore, it takes much time and increases working costs to carry out the work.

The present invention has been made in view of the above-mentioned circumstances and it is the object of the present invention to enable an operator to evaluate the state of security of a system and to support the making of security countermeasures of the system even if the operator does not have a high level of expertise.

In order to solve the above-mentioned problems, the first aspect of the present invention is a method for evaluating security executed to a system constituted by at least one component by the use of an electronic computer, the method comprising the steps of:

a first step of accepting a first specification of a system to be evaluated and a second specification of each of the components constituting the system, from an operator via an input unit connected to the electronic computer;

a second step of retrieving data from a database in which constituent components and security countermeasures to be executed to the constituent components are described for each of system types, and of reading out security countermeasures to be executed to the components constituting the system to be evaluated, which are specified by the second specification, out of the constituent components of the system type corresponding to that of the system to be evaluated which is specified by the first specification;

a third step of displaying on a display unit connected to the electronic computer, the security countermeasures read out in the second step in correspondence with each of the components constituting the system to be evaluated which are specified by the second specification, and of accepting from an operator via the input unit, information whether or not each of the security countermeasures being displayed is executed, for example, in the form of a check list; and a fourth step of evaluating a state of security executed to the system to be evaluated, based on the information that the security countermeasures of the components constituting the system to be evaluated are executed or not, and of displaying the evaluation results on the display unit.

In this connection, the first step may include steps of, for example, reading out all of the system types described in the database, displaying them on the display unit, and accepting from the operator via the input unit a specification of any one of the system types being displayed, as the first specification of the system to be evaluated, and steps of reading out from the database all of the constituent components of the system type specified by the first specification, displaying them on the display unit, and accepting from the operator via the input unit, whether or not each of the constituent components being displayed is used in the system to be evaluated, as the second specification of each of the components constituting the system to be evaluated, for example, in the form of a check list.

Also, in the case where the database describes, as to each of the security countermeasures, a security type ensured by executing the security countermeasure concerned, the fourth step may include the steps of, for example, classifying the security countermeasures of each of the components constituting the system to be evaluated into the security types, determining, as to each of the security types, the ratio of the number of security countermeasures accepted as executed in the third step, to the number of security countermeasures classified into the security type concerned, and displaying on the display unit the ratio for each of the security types as the degree of accomplishment of the security countermeasures.

Also, in the case where the database describes, as to each of the security countermeasures, a security type ensured by executing the security countermeasure concerned and the degree of risk avoided by executing the security countermeasure concerned (this degree of risk is expressed, for example, by annual damages probably caused when the security countermeasure is not executed), the fourth step may include the steps of, for example, classifying the security countermeasures of each of the components constituting the system to be evaluated into security types, determining, as to each of the security types, the total sum of the degrees of risks corresponding to the security countermeasures which are accepted as not executed in the third step, out of the security countermeasures classified into the security type concerned, and displaying on the display unit, the total sum of the degrees of risks of the security countermeasures classified into the security type concerned, as the degree of the remaining risk.

Or, in the case where the database describes, as to each of the security countermeasures, a security type ensured and a cost required by executing the security countermeasure concerned (this cost is expressed, for example, by an annual cost required by executing the security countermeasure), the fourth step may include the steps of, for example, classifying the security countermeasures of each of the components constituting the system to be evaluated into the security types, determining, as to each of the security types, the total sum of the costs corresponding to the security countermeasures accepted as executed in the third step, out of the security countermeasures classified into the security type concerned, and displaying on the display unit, the total sum of the costs for each of the security types as the required cost of the security countermeasures classified into the security type concerned.

In the present aspect of the invention, when an operator specifies a system to be evaluated and its constituent components by the use of the input unit, a security countermeasure list to be executed to the constituent component concerned is displayed on a display unit for each of the components constituting the system to be evaluated. It is possible that the operator looks at the security countermeasures of each of the components displayed on the display unit, and, for example, puts a check against a security countermeasure being displayed by the use of the input unit (in the form of a so-called check list) to input whether or not the security countermeasure is executed. When the operator inputs whether or not each of the security countermeasures of the components displayed on the display unit is executed, by the use of the input unit, a state of security executed to the system to be evaluated is evaluated and the evaluation results are displayed on the display unit.

In this way, according to the present aspect of the present invention, the security countermeasures to be executed to each of the constituent components are displayed, only by operator's specifying the system to be evaluated and the constituent components thereof, and the state of security applied to the system to be evaluated can be evaluated only by operator's inputting whether or not each of the security countermeasures is executed to each of the constituent components being displayed. Therefore, the operator can evaluate the state of security of the system without a high level of expertise.

Next, in order to solve the above-mentioned problems, the second aspect of the present invention is a method for supporting the making of security countermeasures to be executed to a system constituted by at least one component by the use of an electronic computer, the method comprising the steps of:

a first step of accepting a first specification of a system to be supported and a second specification of each of the components constituting the system, from an operator via an input unit connected to the electronic computer;

a second step of retrieving data from a database in which constituent components and the security countermeasures to be executed to the constituent components are described for each of the system types and of reading out the security countermeasures to be executed to each of the components constituting the system to be supported which are specified by the second specification, out of the constituent components of the system type, the system type corresponding to that of the system to be supported which is specified by the first specification; and a third step of displaying on a display unit connected to the electronic computer, the security countermeasures read out in the second step in correspondence with each of the components constituting the system to be supported which are specified by the second specification, for example, in the form of a list.

In this connection, the first step may include, for example, steps of reading out all of the system types described in the database, displaying them on the display unit, and accepting from the operator via the input unit the specification of any one of the system types being displayed as the first specification of a system to be supported, and steps of reading out from the database all of the constituent components of the system type specified by the first specification, displaying them on the display unit, and accepting from the operator via the input unit whether or not each of the constituent components being displayed is used in the system to be supported, as the second specification of the components constituting the system to be supported, for example, in the form of a check list.

Also, in the case where the database describes, as to each of the security countermeasures, a security type ensured by executing the security countermeasure concerned, the second step may read out from the database, the security countermeasures and their security types to be executed to each of the components constituting the system to be supported which is specified by the second specification, out of the constituent components of the system type, the system type corresponding to that of the system to be supported which is specified by the first specification, and the third step may display on the display unit the security countermeasures and their security types which are read out in the second step in correspondence with each of the components constituting the system to be supported which are specified by the second specification.

Also, in the case where the database describes, as to each of the security countermeasures, a security level ensured by executing the security countermeasure concerned, the first step may accept from the operator via the input unit, a third specification of the security level of the security countermeasure applied to the system to be supported, in addition to the first specification of the system to be supported and the second specification of each of the components constituting the system, and the second step may read out from the database the security countermeasures to be executed to the components constituting the system to be supported which are specified in the second specification, out of the constituent components of the system type, the system type corresponding to that of the system to be supported which is specified by the first specification, each of the security countermeasures having a level not higher than the security level specified by the third specification.

In the present aspect of the present invention, when the operator specifies a system to be supported and the constituent components thereof by the use of the input unit, a list of the security countermeasures to be executed to each of the components constituting the system to be supported is displayed on the display unit. In this manner, according to the present aspect, the security countermeasures to be executed to each of the constituent components are displayed only by operator's specifying the system to be supported and the constituent components thereof and, therefore, the operator can construct the security countermeasures to be executed to the system without a high level of expertise.

BRIEF DESCRIPTION OF THE DRAWINGS

Preferred embodiments of the present invention will be described in detail based on the following figures, wherein:

FIG. 2 is an illustration showing one example of a security countermeasure database corresponding to an Internet connection system;

FIG. 3 is an illustration showing one example of a security countermeasure database corresponding to an Internet connection system;

FIG. 4 is an illustration showing one example of a security countermeasure database corresponding to an authentication system;

FIG. 5 is an illustration showing one example of a security countermeasure database corresponding to a plant system;

FIG. 8 is an illustration showing a GUI screen for selecting a system which is to be supported in the making of security countermeasures or whose state of security is to be evaluated;

FIG. 12 is an illustration showing one example of a GUI screen for accepting from an operator a target level of security to be achieved;

FIG. 18 is an illustration for explaining a DB address management table 134 stored in an external storage unit 13 of the security support and evaluation apparatus 1 used in the second preferred embodiment in accordance with the present invention;

DETAILED DESCRIPTION OF THE PREFERRED EMBODIMENTS

The preferred embodiments in accordance with the present invention will be described in the following.

First, the first preferred embodiment in accordance with the present invention will be described.

Figure 1:
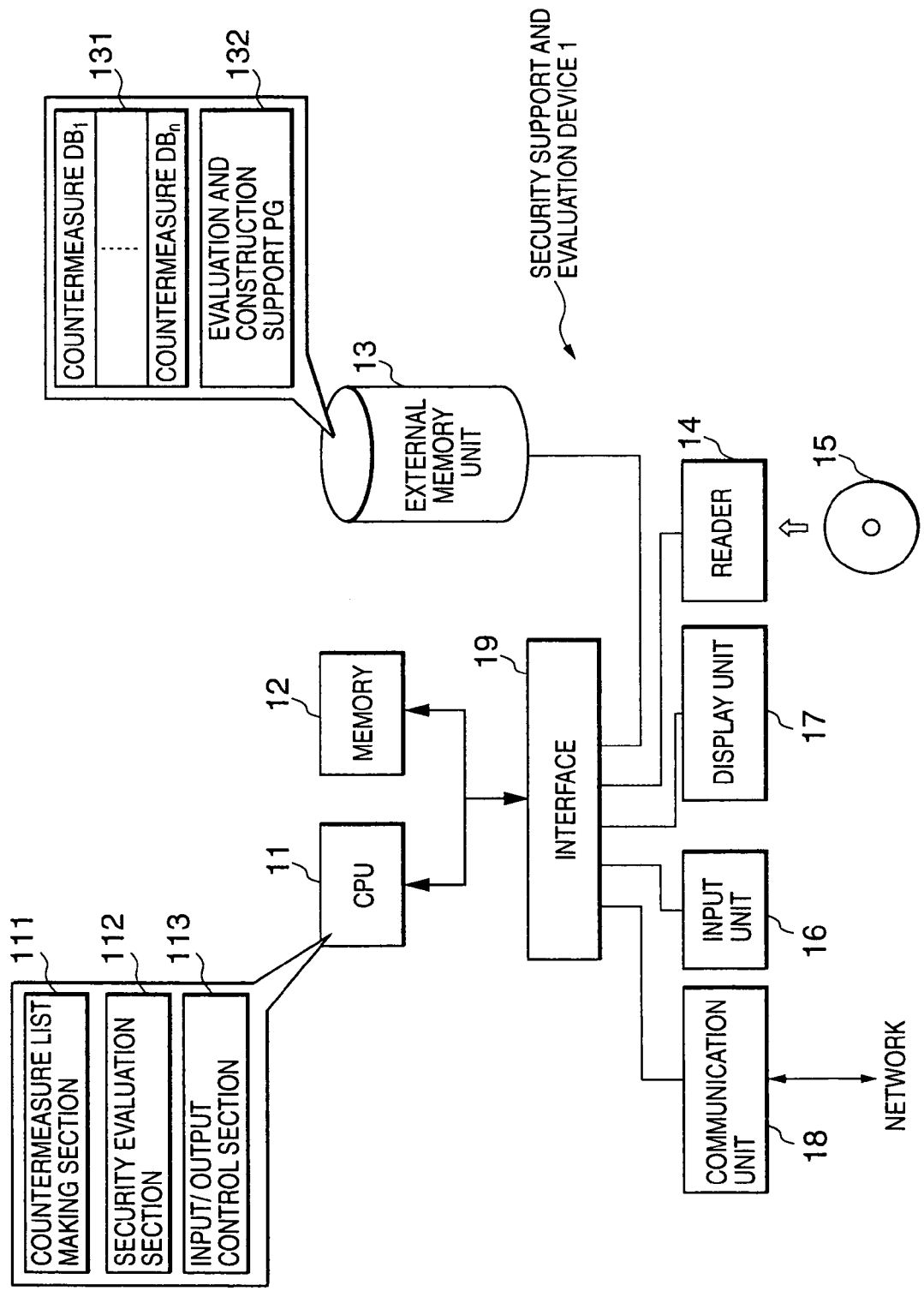
FIG. 1 is a schematic constitutional illustration of a security support and evaluation apparatus 1 to which the first preferred embodiment in accordance with the present invention is applied.

FIG. 1 is a schematic constitutional illustration of a security support and evaluation apparatus 1 to which the first preferred embodiment in accordance with the present invention is applied.

As shown in FIG. 1, a security support and evaluation apparatus 1 of the present preferred embodiment can be constituted on an electronic computer having an ordinary constitution and provided with a CPU 11, a memory 12, an external storage unit 13 such as a hard disk unit, a reader 14 for reading data from a portable storage medium 15 such as a CD-ROM, a FD, or the like, an input unit 16 such as a key board, a mouse, or the like, a display unit 17 such as a CRT, an LCD, or the like, a communication unit 18 connected to a network, and an interface 19 for sending or receiving data to or from the above-mentioned constituent units.

Here, in the external storage unit 13 is stored a security evaluation and construction support program PG 132 for constructing the security support and evaluation apparatus 1 of the present preferred embodiment on the electronic computer, and the CPU 11 executes the program PG 132 loaded into the memory 12 to realize, as processes, a countermeasure list making section 111 for making a list of security countermeasures to be executed on each constituent component of an objective system specified by an operator, a security evaluation section 112 for evaluating a state of security of the objective system based on the information accepted from the operator, whether or not the security countermeasures to be executed to each of the constituent components of the objective system is executed, and an input/output control section 113 for controlling the input unit 16 and the display unit 17 to accept various kinds of commands from the operator or to display an output from the countermeasure list making section 111 and the security evaluation section 112.

In this connection, the program 132 may be read out from the portable storage medium 15 such as a CD-ROM, a FD, or the like by means of a reader 14 and be installed in the external storage unit 13, or may be down-loaded into the external storage unit 13 from a network by means of a communication unit 18. In FIG. 1, although the program 132 is once stored in the external storage unit 13 and then is loaded into the memory 12 and is executed by the CPU 11, the program 132 may be read out from the portable storage medium 15 by the reader 14 and be directly loaded into the memory 12 and be executed by the CPU 11, or the program 132 may be directly loaded into the memory 12 from the network via the communication unit 18 and be executed by the CPU 11.

Further, in the external storage unit 13 are previously stored countermeasure databases $DB_1$ to $DB_n$ 131 each of which describes, as to each of the system types to which the security evaluation and construction support in accordance with the present preferred embodiment are intended to apply, security countermeasures to be applied to the constituent components of a system of the system type concerned. In the present preferred embodiment, an Internet connection system, an authentication system, and a plant system are assumed as the system types to which the security evaluation and construction support are intended to apply.

FIG. 2 to FIG. 5 show one example of a countermeasure database.

Here, FIG. 2 and FIG. 3 show the content of a countermeasure database corresponding to an Internet connection system. FIG. 4 shows the content of a countermeasure database corresponding to an authentication system, and FIG. 5 shows the content of a countermeasure database corresponding to plant system.

In FIG. 2 to FIG. 5, the countermeasure types (security types) are described in column 201. In column 202, a security countermeasure for ensuring security described in the box of the countermeasure type in the same row is described. In column 203, an assumed threat that is assumed by the security countermeasure described in the box of the countermeasure type in the same row is described. In column 204, there is described a functional-requirement which is selected from the catalog of security functional requirements stipulated in a security evaluation standard common criterion (IS 15408) and which satisfies the security countermeasure described in the box of the countermeasure type in the same row. If it is mandatory to take the security countermeasure described in the box of the countermeasure type in the same row, by the criterion of the line of business (for example, a finance industry), a message to the effect that it is mandatory to execute the security countermeasure is described in column $205_i$.

Also, column $206_i$ is provided for each of the constituent components, which are intended for use as a component of an objective system. In the case where a security countermeasure described in the box of the security countermeasure in the same row is available to be applied, in the column $206_i$ there are described a security level L1, L2, or L3 ensured by applying the security countermeasure, an annual required cost C1, C2, C3, C4, or C5 necessary to apply the security countermeasure, and a remaining risk R1, R2, R3, R4, or R5 shown by annual damages arising when the assumed threat described in the box of an assumed threat in the same row is turned into reality by not applying the security countermeasure.

Further, column 207 is provided for a facility in which constituent components intended for use as the components of an objective system are installed. In the case where the security countermeasure described in the box of the security countermeasure in the same row is available to be applied, as is the case with the column $206_i$, in column 207 are described a security level L1, L2, or L3 ensured by applying the security countermeasure, an annual requirement cost C1, C2, C3, C4, or C5 necessary to apply the security countermeasure, and a remaining risk R1, R2, R3, R4, or R5 shown by annual damages arising when the assumed threat described in the box of the assumed threat in the same row is turned into reality by not applying the security countermeasure.

Still further, in the case where the security countermeasure described in the box of the security countermeasure in the same row is available to be applied to the operation of an objective system, as is the case with the column $206_i$, in column 208 are described a security level L1, L2, or L3 ensured by applying the security countermeasure, an annual required cost C1, C2, C3, C4, or C5 necessary to apply the security countermeasure, and a remaining risk R1, R2, R3, R4, or R5 shown by annual damages arising when the assumed threat described in the box of the assumed threat in the same row is turned into reality by not applying the security countermeasure.

In this connection, the specific values of the security levels L1, L2, and L3, the annual required costs C1, C2, C3, C4, and C5, and the annual remaining risks R1, R2, R3, R4, and R5 are shown in FIG. 2 to FIG. 5.

For example, in the countermeasure database made in correspondence with the Internet connection system shown in FIG. 2 and FIG. 3, the security countermeasure of "set a password on an individual basis" is included in the countermeasure type of "management of access authorization", an assumed threat that is assumed by the security countermeasure is "illegal use", and the security function satisfying the security countermeasure is a functional requirement of "FMT_MSA. 1" stipulated in the security evaluation standard common criterion (IS 15408). Also, the security countermeasure of "set a password on an individual basis" can be applied to a WWW server and a client, out of the constituent components of the Internet connection system. Further, a security level ensured by applying the security countermeasure to the WWW server is L3 (strongest), an annual required cost necessary to apply the security countermeasure to the WWW server is C2 (less than one million yen), and annual damages (remaining risk) arising in the case where the assumed threat of "illegal use" is turned into reality by not applying the security countermeasure to the WWW server is R2 (less than one million yen). Still further, a security level ensured by applying the security countermeasure to a client is L3 (strongest), an annual requirement cost necessary to apply the security countermeasure to the client is C2 (less than one million yen), and annual damages (remaining risk) arising in the case where an assumed threat of "illegal use" is turned into reality by not applying the security countermeasure to the client is R2 (less than one million yen).

In this connection, it is desirable that the content described in each box of the columns $206_i$, 207, and 208 of the database shown in FIG. 2 to FIG. 5 is determined based on the results of the analysis of threat or risk conducted in advance.

Next, the processing of the security support and evaluation apparatus 1 of the above-mentioned constitution will be described.

Figure 6:
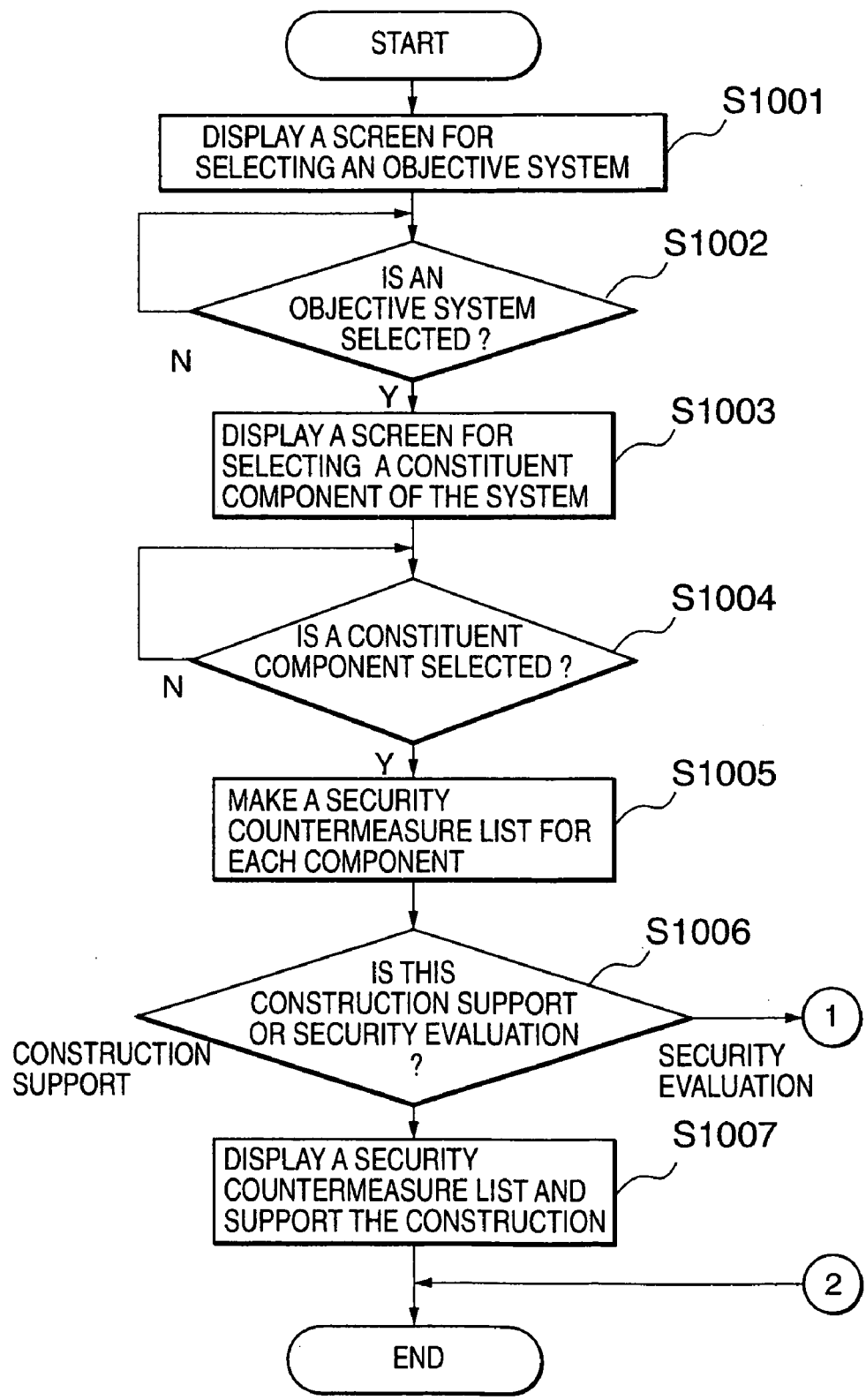
FIG. 6 is a flow chart to explain the process of the security support and evaluation apparatus 1 of the first preferred embodiment in accordance with the present invention.
Figure 7:
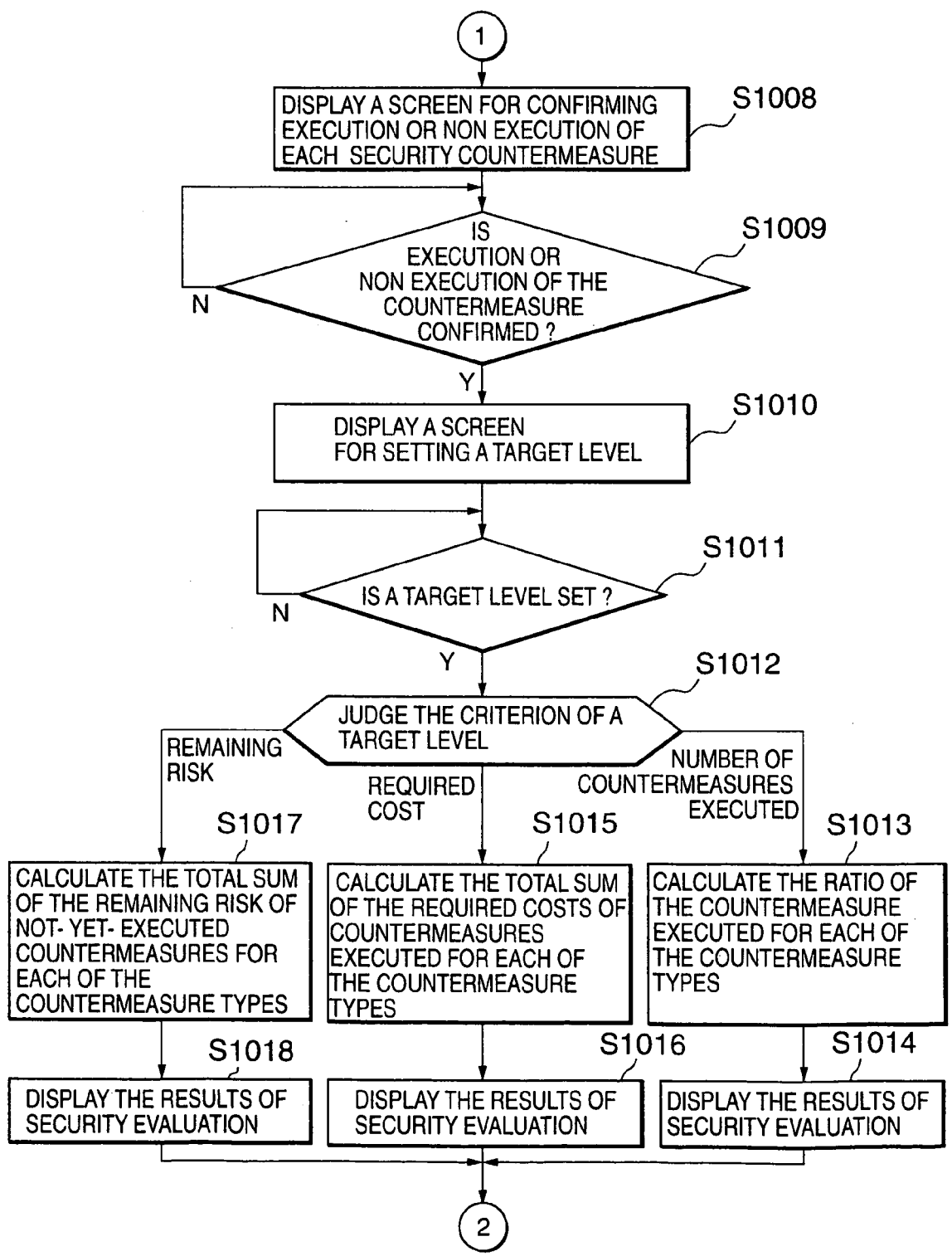
FIG. 7 is a flow chart to explain the process of a security support and evaluation apparatus 1 of the first preferred embodiment in accordance with the present invention.

FIG. 6 and FIG. 7 are flow charts for explaining the processing of the security support and evaluation apparatus 1 of the first preferred embodiment in accordance with the present invention.

First, the countermeasure list making section 111 displays a GUI screen including the list of the names of the objective system of the countermeasure databases $DB_1$ to $DB_n$ 131 stored in the external storage unit 13 and for selecting a name of the system which becomes the object of support for the making of security countermeasures or the system which becomes the object of evaluation of the state of security, as shown in FIG. 8, on the display unit 17 by the use of the input/output control section 113 (step S1001).

When a name of the system which becomes the object of support for the making of security countermeasures or the system which becomes the object of evaluation of the state of security is selected by an operator by the use of the input unit 16 via a GUI screen shown in FIG. 8 (in FIG. 8 is shown the example in which an Internet connection system is selected) (step S1002), the countermeasure list making section 111 reads out the names of the constituent components of the selected system from the countermeasure databases $DB_1$ to $DB_n$ 131 stored in the external storage unit 13. Then, a GUI screen including a list of names of the constituent components of the selected system and for selecting a constituent component of the system which becomes the object of support for making of security countermeasures or the constituent component of the system which becomes the object of evaluation of the state of security, as shown in FIG. 9, is displayed on the display unit 17 by the use of the input/output control section 113 (in FIG. 9 is shown the example in which an Internet connection system is an objective system) (step S1003).

Figure 9:
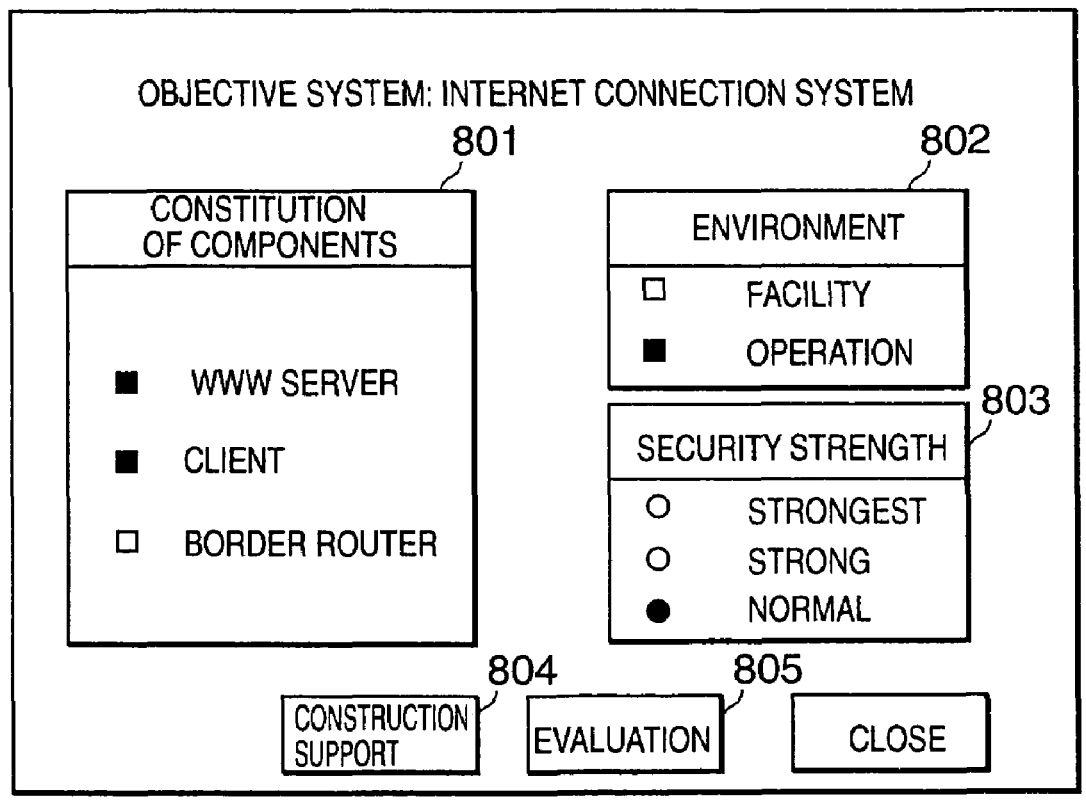
FIG. 9 is an illustration showing a GUI screen for selecting components of the system which is to be supported in the making of security countermeasures or whose state of security is to be evaluated.

In this connection, in FIG. 9, an item of "constitution of component" 801 is provided for selecting a component actually used in the system which becomes the object of support for making security countermeasures or the object of evaluation of the state of security from the components constituting a system read out from the corresponding countermeasure databases $DB_1$, to $DB_n$ 131 and selected in step S1002. The operator can put a check by the use of the input unit 16 against the name of a component being used.

An item of "environment" 802 is provided for setting whether or not the facility in which the constituent components of an objective system are installed and the operation of the objective system are included in the object of support for making security countermeasures or the object of evaluation of the state of security. The operator can put a check by the use of the input unit 16 against what he or she wants to include in the object. Also, an item of "security strength" 803 is provided for setting the level of security in supporting the making of the security countermeasures or in evaluating the state of security, and the operator can put a check by the use of the input unit 16 against a level that he or she wants to set. Here, a level of "normal" is to be selected in the case where supporting the making of the security countermeasures or evaluation of the state of security is conducted for the purpose of ensuring a minimum essential security of the objective system. This level corresponds to a level L1 shown in FIG. 2 to FIG. 5. A level of "strongest" is to be selected in the case supporting the making of the security countermeasures or evaluation of the state of security is conducted for the purpose of ensuring a maximum security of the objective system. This level corresponds to a level L3 shown in FIG. 2 to FIG. 5. Also, a level of "strong" is in the middle between the level of "normal" and the level of "strongest" and corresponds to a level L2 shown in FIG. 2 to FIG. 5. Further, a button of "countermeasure construction support" 804 is to be selected in the case where the present apparatus 1 supports the making of security countermeasures and a button of "security evaluation" 805 is to be selected in the case where the present apparatus 1 executes the evaluation of security.

Next, when the operator puts a check against the necessary items by the use of the input unit 16 and selects either the button 804 or the button 805 via the GUI screen shown in FIG. 9 (step S1004), the countermeasure list making section 111 reads out necessary information from the countermeasure databases $DB_1$–$DB_n$ 131 corresponding to the system selected in the step S1002 and makes a security countermeasure list as to each of the components checked in the item of "constitution of component" 801 and the environment checked in the item "environment" 802 (step S1005).

Taking the case shown in FIG. 9 (where a WWW server and a client are checked in the item of "constitution of component" 801 and an operation is checked in the item of "environment" 802) as an example, a process of making a security countermeasure list will be described below.

First, in each row of the column $206_1$ of "WWW server" of the database of the Internet connection system shown in FIG. 2 and FIG. 3, attention is to be directed toward the rows in which it is described that the security countermeasure in the same row is available to be applied and that the security level ensured when the security countermeasure is applied is not higher than a level checked in the item of "security strength" in FIG. 9 (here, "normal"=L1). Then, as to each of the rows to which attentions are directed, the contents described in the column $206_1$ of "WWW server" and in the columns 201 to 204, and $205_i$ are read out and a security countermeasure list for the WWW server is made based on the contents thus read out. The above-mentioned processing is executed for the column $206_2$ of "client" and the column 208 of "operation" in the same way to thereby make a security countermeasure list for the client and a security countermeasure list for the operation.

When the countermeasure list making section 111 makes the security countermeasure lists for each of the components checked in the item of "constitution of component" 801 and the environments checked in the item of "environment" 802 in the screen shown in FIG. 9, as mentioned above, the countermeasure list making section 111 then judges whether the button selected in a step S1004 is the button of "countermeasure construction support" 804 or the button of "security evaluation" 805 (step S1006).

In the case where the button of "countermeasure construction support" 804 is selected, the countermeasure list making section 111 displays on the display unit 17 via the input/output control section 113, the security countermeasure lists which are made in the step S1005 for each of the components checked in the item of "constitution of component" 801 and each of the environments checked in the item of "environment" 802 to support the making of the security countermeasures (step S1007).

Figure 10:
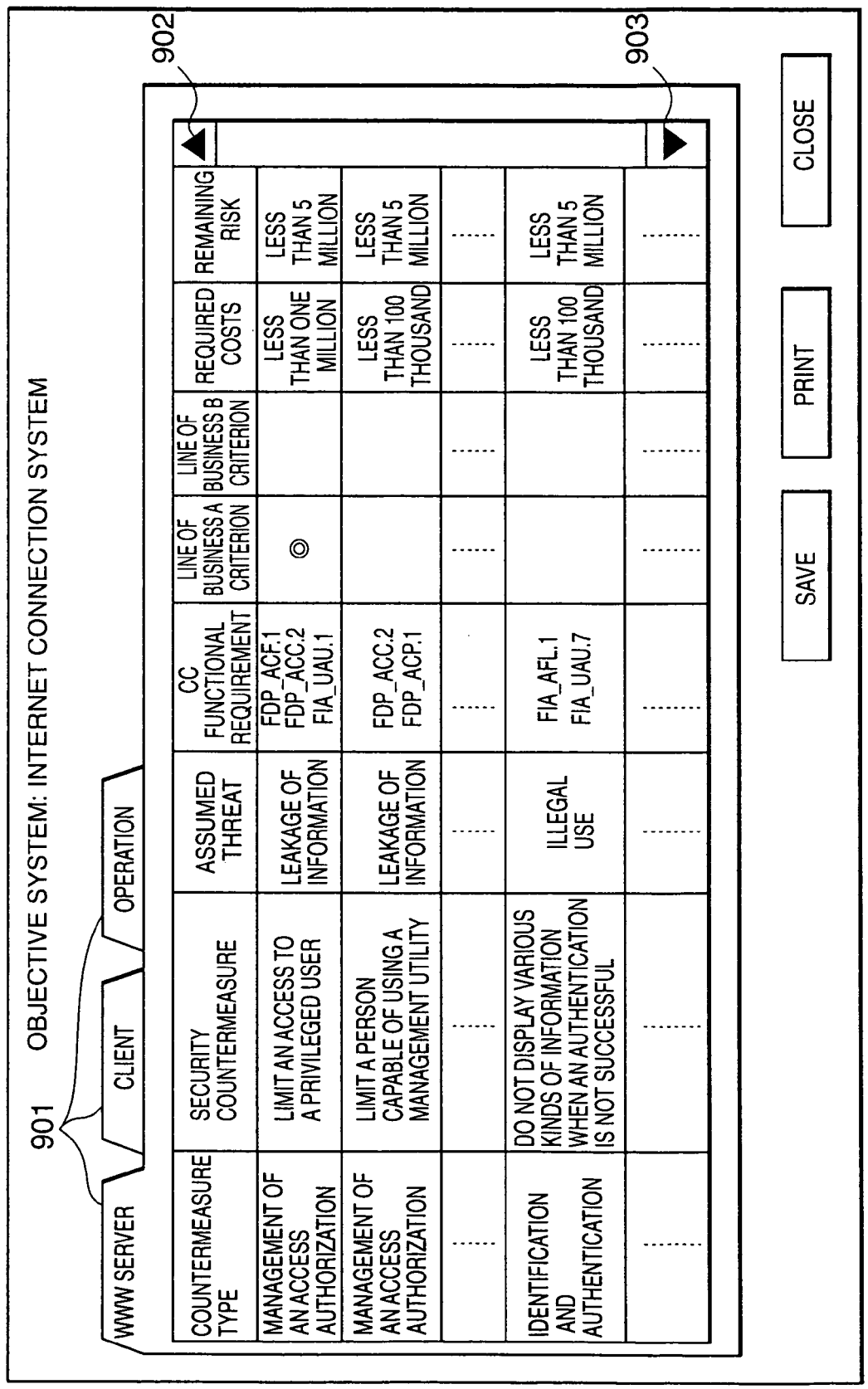
FIG. 10 is an illustration showing one example of a security countermeasure list shown for supporting the making of the security countermeasures.

FIG. 10 is an illustration showing an example of the security countermeasure lists displayed for supporting the making of the security countermeasures. This example shows lists made from the database of the Internet connection system shown in FIG. 2 and FIG. 3 according to the contents checked shown in FIG. 9. Here, the security countermeasure lists of the WWW server, the client, and the operation are separately displayed, and the operator can display a desired security countermeasure list by selecting a tag 901 by the use of the input unit 16. In this connection, reference characters 902, 903 designate buttons for scrolling the security countermeasure list, which is being displayed.

On the other hand, in the case where the button of "security evaluation" 805 is selected in the step S1006, the security evaluation section 112 displays on the display unit 17 via input/output control section 113, a GUI screen for making sure whether or not each of the security countermeasures included in each of the security countermeasure lists are executed, those lists being made in the step S1005 for each of the components checked in the item of "constitution of component" 801 and the environments checked in the item of "environment" 802 (step S1008).

Figure 11:
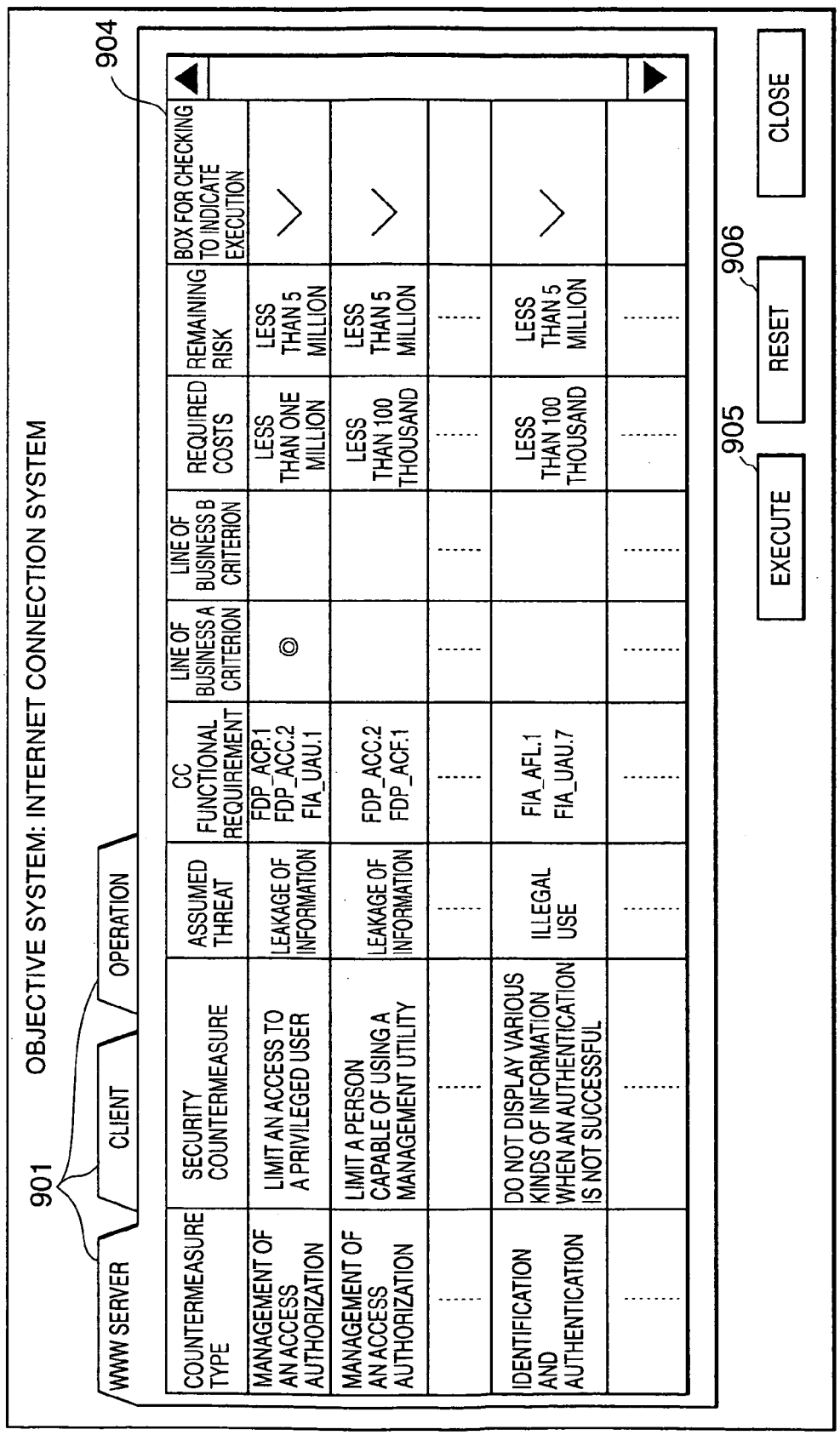
FIG. 11 is one example of a GUI screen for checking whether or not each of the security countermeasures displayed is executed for the evaluation of security.

FIG. 11 is an illustration showing an example of the GUI screen for making sure whether or not each of the security countermeasures displayed for security evaluation is executed. This example shows a GUI screen made on the basis of the lists made from the database of the Internet connection system shown in FIG. 2 and FIG. 3 according to the contents shown in FIG. 9. Here, the GUI screen shown in FIG. 11 has the constitution in which column 904 is added to the display screen shown in FIG. 10, the column 904 including input boxes in each of which it is possible to put a check so as to indicate that the security countermeasure described in the same row is executed. In this connection, a button of "reset" 906 is provided for resetting the check in each input box of the column 904 and for putting a check again.

When the operator puts a check via the GUI screen shown in FIG. 11 as described above, in at least one of the input boxes by the use of the input unit 16, and then selects the button of "execute" 905 (step S1009), the security evaluation section 112 displays a GUI screen shown in FIG. 12 for accepting the target level of security to be accomplished from the operator on the display unit 17 via the input/output control section 113 (step S1010).

In the example shown in FIG. 12, the operator can select from three setting patterns of the target level of security for each of the components and environments displayed on the GUI screen shown in FIG. 11; setting by the ratio of the number of executed (achieved) security countermeasures to the number of security countermeasures for each of the countermeasure types (910), setting by the total sum of the required costs for the executed security countermeasures for each of the countermeasure types (911), or setting by total sum of remaining risks caused by the not-yet-executed (not achieved) security countermeasures for each of the countermeasure types. Here, in the case where the target level of security is set by the ratio of the number of executed security countermeasures to the number of security countermeasures for each of the countermeasure types, it is possible to select the adoption of the criterion of a specific line of business (line of business A, B) as an option. When the adoption of the criterion of a specific line of business is selected, the target level of security is set as the ratio of the number of executed security countermeasures to the number of security countermeasures obliged by the criterion for each of the countermeasure types. In this connection, in FIG. 12 is shown an example in which the ratio of the number of executed security countermeasures to the number of security countermeasures for each of the countermeasure types is set at 80% or more.

When the operator sets the target level of security by the use of the input unit 16 via the GUI screen shown in FIG. 12 (step S1011) as mentioned above, then, the state of security of the objective system is evaluated according to the contents of settings (step S1012).

For example, in the case where the target level of security is set as the ratio of the number of executed security countermeasures to the number of security countermeasures for each of the countermeasure types in the step S1011, the security evaluation section 112 determines, as to each of the components and the environments displayed on the GUI screen shown in FIG. 11 (that is for each of the WWW server, the client, and the operation), the ratio of the number of executed security countermeasures (that is, a check indicating execution is put in the input box), to the number of security countermeasures classified into each of the countermeasure types (step S1013). Then, the security evaluation results are displayed on the display unit 17 via the input/output control section 113 (step S1014).

Figure 13:
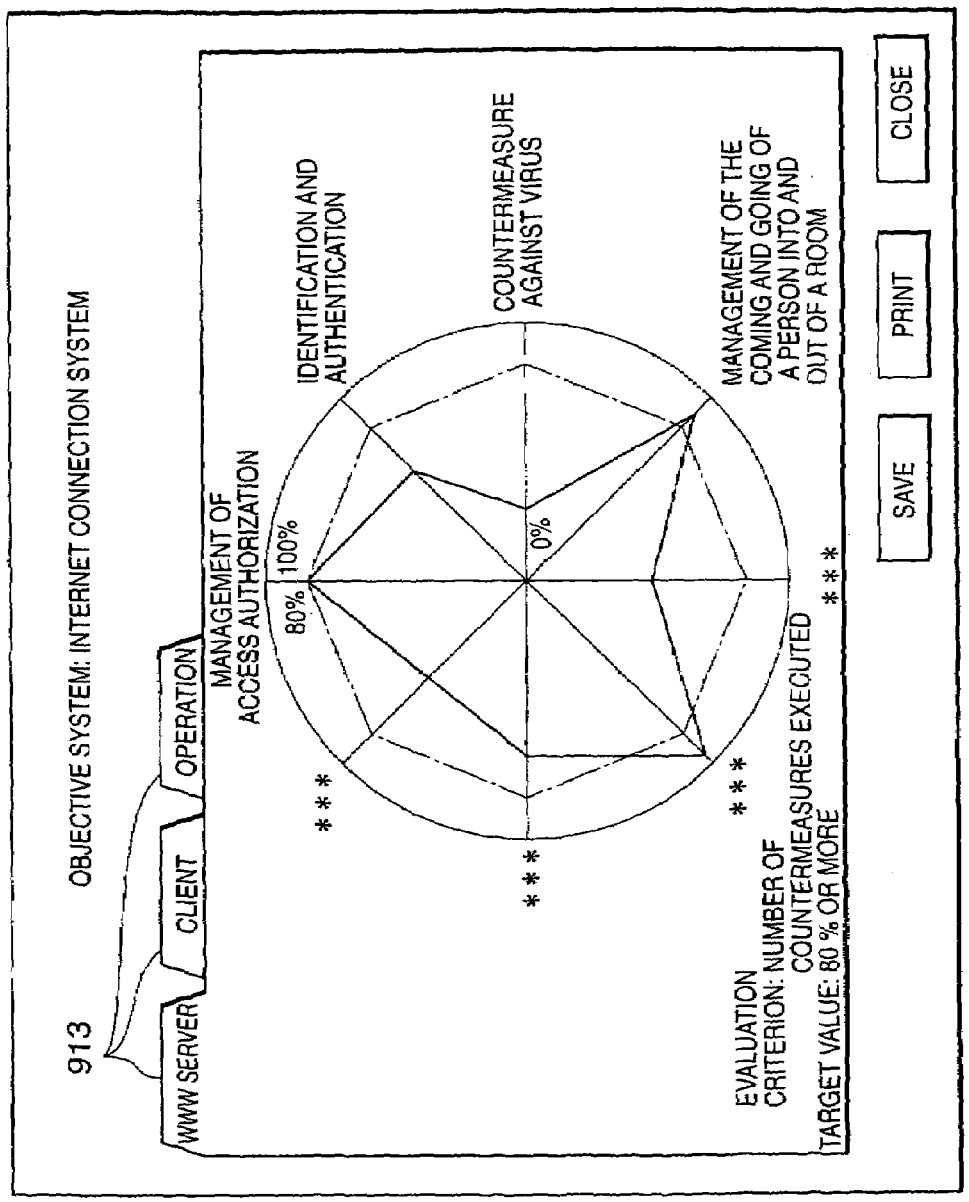
FIG. 13 is an illustration showing the results of the evaluation of security in the case where the target level of security is set as a ratio of the number of executed security countermeasures to the number of security countermeasures for each of the countermeasure types.

FIG. 13 shows an example of the results of the security evaluation in the case where the target level of security is set as the ratio of the number of executed security countermeasures to the number of security countermeasures for each of the countermeasure types. This example shows the case where the target level of security is set at 80% or more in the GUI screen shown in FIG. 12. Here, the security evaluation results of each of the WWW server, the client, and the operation are separately displayed and the operator can display the desired security evaluation results by selecting the tag 913 by the use of the input unit 16.

Also, in the example shown in FIG. 13, the ratio of the number of executed security countermeasures to the number of security countermeasures for each of the countermeasure types is displayed by the use of a so-called radar chart having the countermeasures types as axes. Here, a solid line shows a line joining the points on the axes each of which corresponds to the ratio of the number of executed security countermeasures to the number of security countermeasures for the countermeasure type designated by the axis, that is, the results of security evaluation. On the other hand, a dotted line is a line joining points on the axes corresponding to the target values set in the GUI screen shown in FIG. 12. The operator can visually grasp the state of security executed to the objective system by comparing the solid line showing the results of security evaluation with the dotted line showing the target levels.

When the set target level of security is the ratio of the number of executed security countermeasures to the number of security countermeasures for each of the countermeasure types and when the criterion of the specific line of business is set as an option in the step S1011, as to each of the components and the environments displayed on the GUI screen shown in FIG. 11, the ratio of the number of executed security countermeasures being obliged as the criterion of the specific line of business, to the number of security countermeasures that are classified into the countermeasure types being obliged as the criterion of the specific line of business for each of the countermeasure types is determined in the step S1013.

Also, for example, in the case where the target level of security is set as the total sum of the cost required by the executed security countermeasures for each of the countermeasure types in the step S1011, the security evaluation section 112 determines, as to each of the components and the environments displayed on the GUI screen shown in FIG. 11, the total sum of the cost required by the executed security countermeasures, out of those classified into a countermeasure type for each of the countermeasure types (step S1015). Then, the results of security evaluation are displayed on the display unit 17 via the input/output control section 113 (step S1016).

Figure 14:
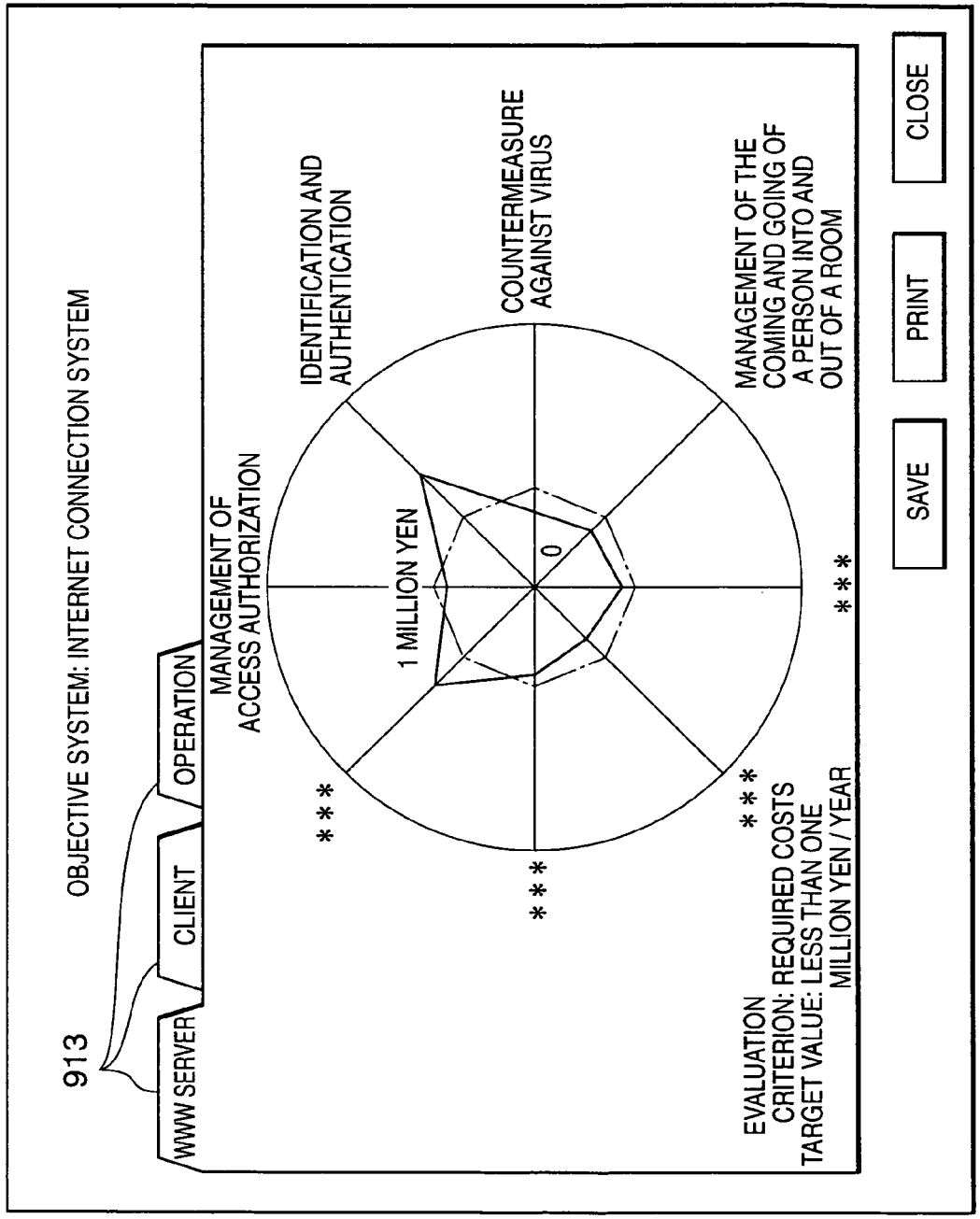
FIG. 14 is an illustration showing the results of the evaluation of security in the case where the target level of security is set as a total sum of the required cost of the executed security countermeasures for the each of the countermeasure types.

FIG. 14 shows an example of the results of the security evaluation in the case where the target level of security is set as the total sum of the cost required by the executed security countermeasures for each of the countermeasure types. This example shows the case where a target value is set at less than one million yen/year in the GUI screen shown in FIG. 12. Also, in the example shown in FIG. 14, as is the case in FIG. 13, the total sum of the cost required by the executed security countermeasures for each of the countermeasure types is displayed by the use of a so-called radar chart having the countermeasure types as axes. Here, a solid line shows a line joining the points on the axes each of which corresponds to the total sum of the cost required by the executed security countermeasures for each of the countermeasure types designated by the axis, that is, the results of security evaluation. On the other hand, a dotted line is a line joining points on the axes corresponding to the target values set in the GUI screen shown in FIG. 12. The operator can visually grasp the state of security executed to the objective system by comparing the solid line showing the results of security evaluation with the dotted line showing the target levels.

Also, for example, in the case where the target level of security is set as the total sum of remaining risks caused by the not-yet-executed security countermeasures for each of the countermeasure types in the step S1011, the security evaluation section 112 determines, as to each of the countermeasure types for the components and the environments displayed on the GUI screen shown in FIG. 11, the total sum of the remaining risks that are classified into the countermeasure type and that are caused by the not-yet-executed security countermeasures for each of the countermeasure types (step S1017). Then, the results of security evaluation are displayed on the display unit 17 via the input/output control section 113 (step S1018).

Figure 15:
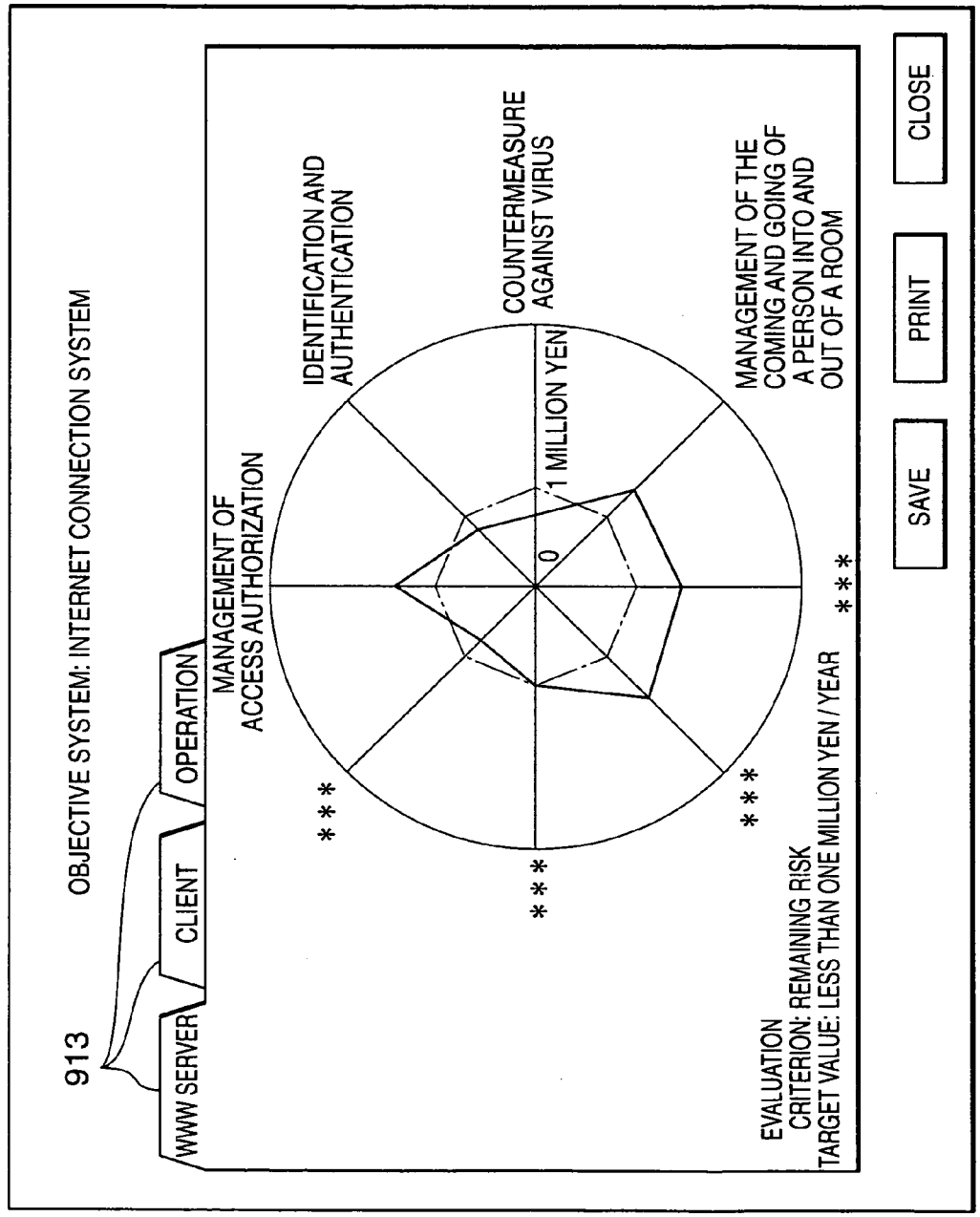
FIG. 15 is an illustration showing the results of evaluation of security in the case where the target level of security is set as a total sum of the remaining risks caused by the not-yet-executed security countermeasures for each of the countermeasure types.

FIG. 15 shows an example of the results of the security evaluation in the case where the target level of security is set as the total sum of the remaining risks caused by the not-yet-executed security countermeasures for each of the countermeasure types. This example shows the case where a target value is set at less than one million yen/year in the GUI screen shown in FIG. 12. Also, in the example shown in FIG. 15, as is the case in FIG. 13, the total sum of the remaining risks caused by the not-yet-executed security countermeasures for each of the countermeasure types is displayed by the use of a so-called radar chart having the countermeasures types as axes. Here, a solid line shows a line joining the points on the axes each of which corresponds to the total sum of the remaining risks caused by the not-yet-executed security countermeasures for each of the countermeasure types designated by the axis, that is, the results of security evaluation. On the other hand, a dotted line is a line joining points on the axes corresponding to the target values set in the GUI screen shown in FIG. 12. The operator can visually grasp the state of security executed to the objective system by comparing the solid line showing the results of security evaluation with the dotted line showing the target levels.

Up to this point, the first preferred embodiment in accordance with the present invention has been described.

In the first preferred embodiment, when the operator specifies the constituent components of the objective system and selects the evaluation button by the use of the input unit 16 in the GUI screen shown in FIG. 9, the GUI screen including the security countermeasure lists to be executed to the specified components, as shown in FIG. 11, is displayed on the display unit 17. The operator looks at the countermeasures of each component displayed on the display unit 17 and puts a check mark in the input box for indicating the corresponding countermeasure is executed or not (that is, in the form of a check list) by the use of the input unit 16. When the operator inputs whether or not each of the security countermeasures for each of the components displayed on the display unit 17 is executed, by the use of input unit 16, the evaluation of the security countermeasures executed to the objective system is made on the basis of the inputted data and the results of the security evaluation are displayed on the display unit 17.

In this manner, according to the present preferred embodiment, simply a matter of operator's specifying the constituent components of the objective system the security of which is to be evaluated makes it possible to display the security countermeasures to be executed to the constituent components. Also, simply a matter of operator's input whether or not each of the security countermeasures is executed to the constituent components being displayed makes it possible to evaluate the security of the objective system. Therefore, the operator can evaluate the state of security of the objective system, without a high level of expertise.

Also, in the present preferred embodiment, the operator can set the target level of security in the GUI screen shown in FIG. 12. Also, as shown in FIG. 13 to FIG. 15, the results of security evaluation are displayed in such a way that it can be compared with the set target levels. This enables the operator to obtain the results of security evaluation, which are produced in consideration of the circumstances specific to the objective system to be evaluated, such as the size of the system, the security level required of the system.

Further, in the present preferred embodiment, when the operator specifies the constituent components of the objective system and selects the button of "construction support" by the use of the input unit 16 in the GUI screen shown in FIG. 9, the GUI screen including the security countermeasure lists to be executed to the specified components, as shown in FIG. 10, is displayed on the display unit 17. In this manner, according to the present preferred embodiment, only a matter of operator's specifying the constituent components of the objective system toward which security countermeasures are to be constructed makes it possible to display the security countermeasures to be executed to the constituent components thus specified. Therefore, the operator can construct security countermeasures to be executed the objective system, without a high level of expertise.

Still further, since the security countermeasures having a strength not higher than a security strength selected in the GUI screen shown in FIG. 9 is displayed in the security countermeasure lists shown in FIG. 10, the operator can display security countermeasure lists to be executed to the objective system in consideration of the circumstances specific to the objective system such as the size of the objective system and the security level required of the objective system.

Next, the second preferred embodiment in accordance with the present invention will be described.

Figure 16:
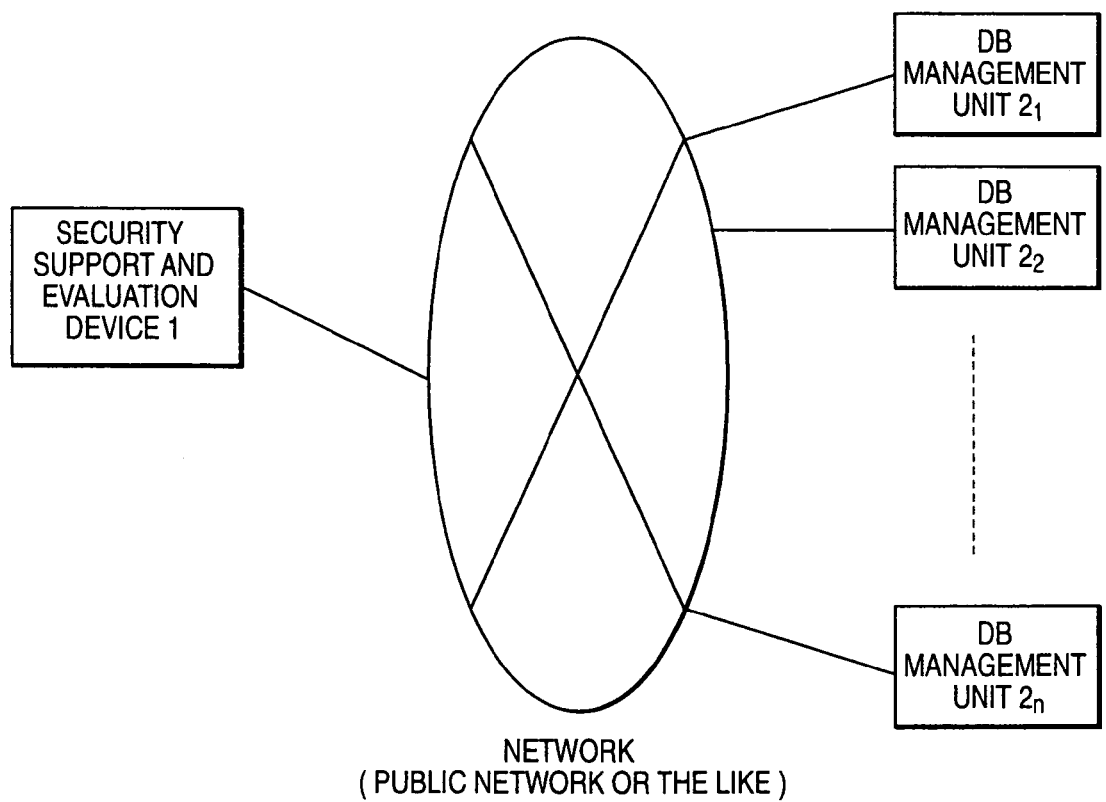
FIG. 16 is a schematic illustration of a security support and evaluation system to which the second preferred embodiment in accordance with the present invention is applied.

FIG. 16 is a schematic illustration of a security support and evaluation system to which the second preferred embodiment in accordance with the present invention is applied.

In the above-mentioned first preferred embodiment, the case has been described in which the security countermeasure databases $DB_1$–$DB_n$ 131 are stored in the external storage unit 13 of the security support and evaluation apparatus 1. In contrast to this, in the present preferred embodiment, as shown in FIG. 16, in consideration of the case where a security support and evaluation apparatus 1 is constructed on, for example, a portable electronic computer, security countermeasure databases $DB_1$ to $DB_n$ 131 are stored in database management units $2_1$, to $2_n$ ($n \leq 1$) constructed on an electronic computer other than the security support and evaluation apparatus 1 and the security support and evaluation apparatus 1 accesses to the database management units $2_i$ ($1 \leq i \leq n$) via a network such as a public network to obtain information necessary to make security countermeasure lists.

Figure 17:
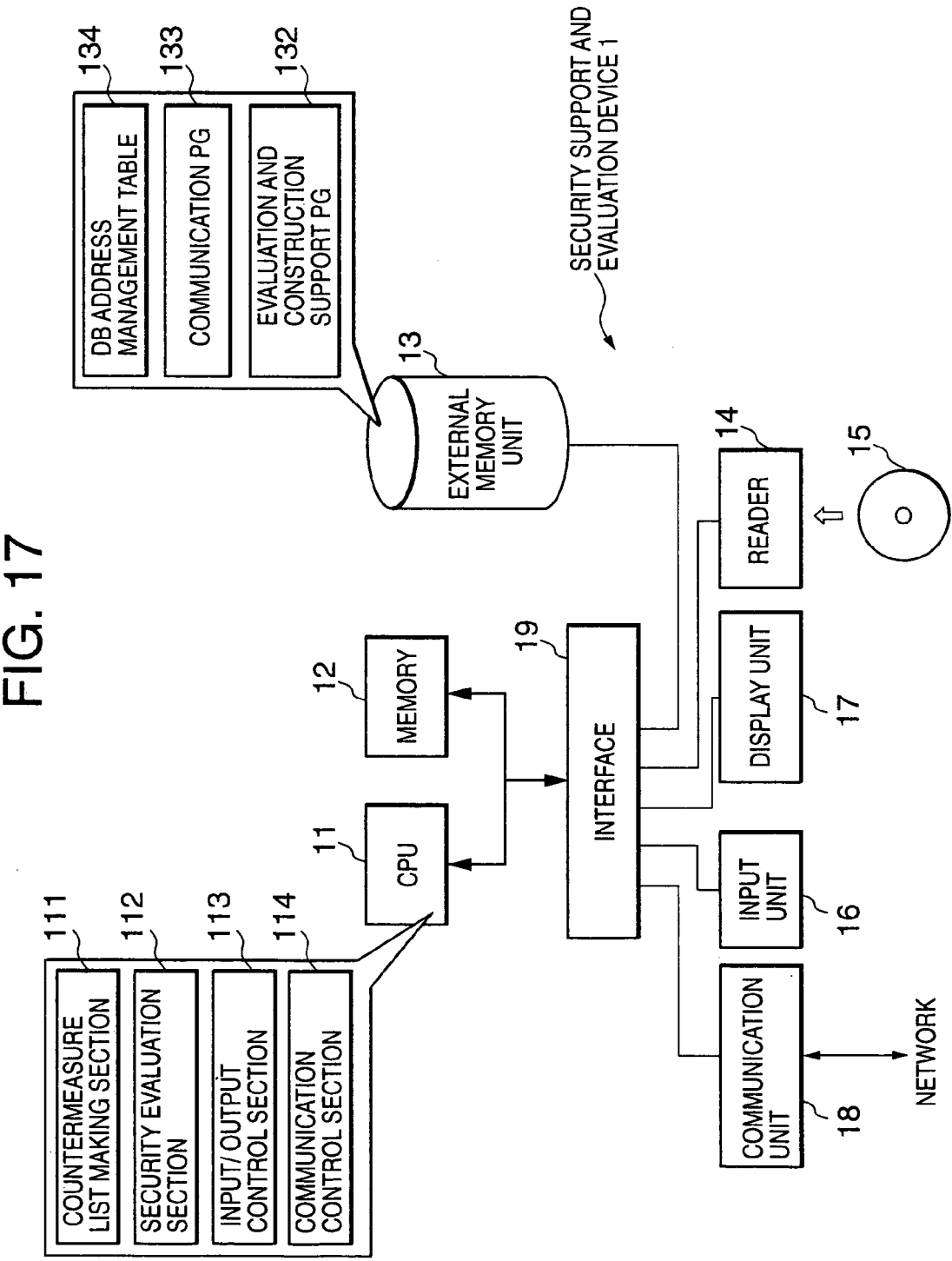
FIG. 17 is a schematic constitutional illustration of a security support and evaluation apparatus 1 used in the second preferred embodiment in accordance with the present invention.

FIG. 17 is a schematic constitutional illustration of a security support and evaluation apparatus 1 used in the second preferred embodiment in accordance with the present invention. Here, parts having the same functions as the security support and evaluation apparatus 1 used in the first preferred embodiment in accordance with the present invention shown in FIG. 1 have the same reference numerals.

As shown in FIG. 17, the security support and evaluation apparatus 1 used in the second preferred embodiment is different from the security support and evaluation apparatus 1 used in the first preferred embodiment shown in FIG. 1 in that the security countermeasure databases $DB_1$ to $DB_n$ 131 are not stored in an external storage unit 13 and that in the external storage unit 13 are stored a communication program PG 133 for accessing the database management units $2_1$ to $2_n$, ($n \geq 1$) via a network and a database address management table 134 in which the access points (addresses) of the respective database management units $2_1$ to $2_n$ shown in FIG. 18 are stored. A CPU 11 loads a communication PGM 133 into memory 12 and executes the PGM 133 so as to realize, as a process, a communication control section 114 which processes various kinds of groups of protocols necessary to access the database management units $2_1$ to $2_n$ via the network such as a public network by means of a communication unit 18 and to establish a communication between the database management units $2_1$ and $2_n$.

Figure 19:
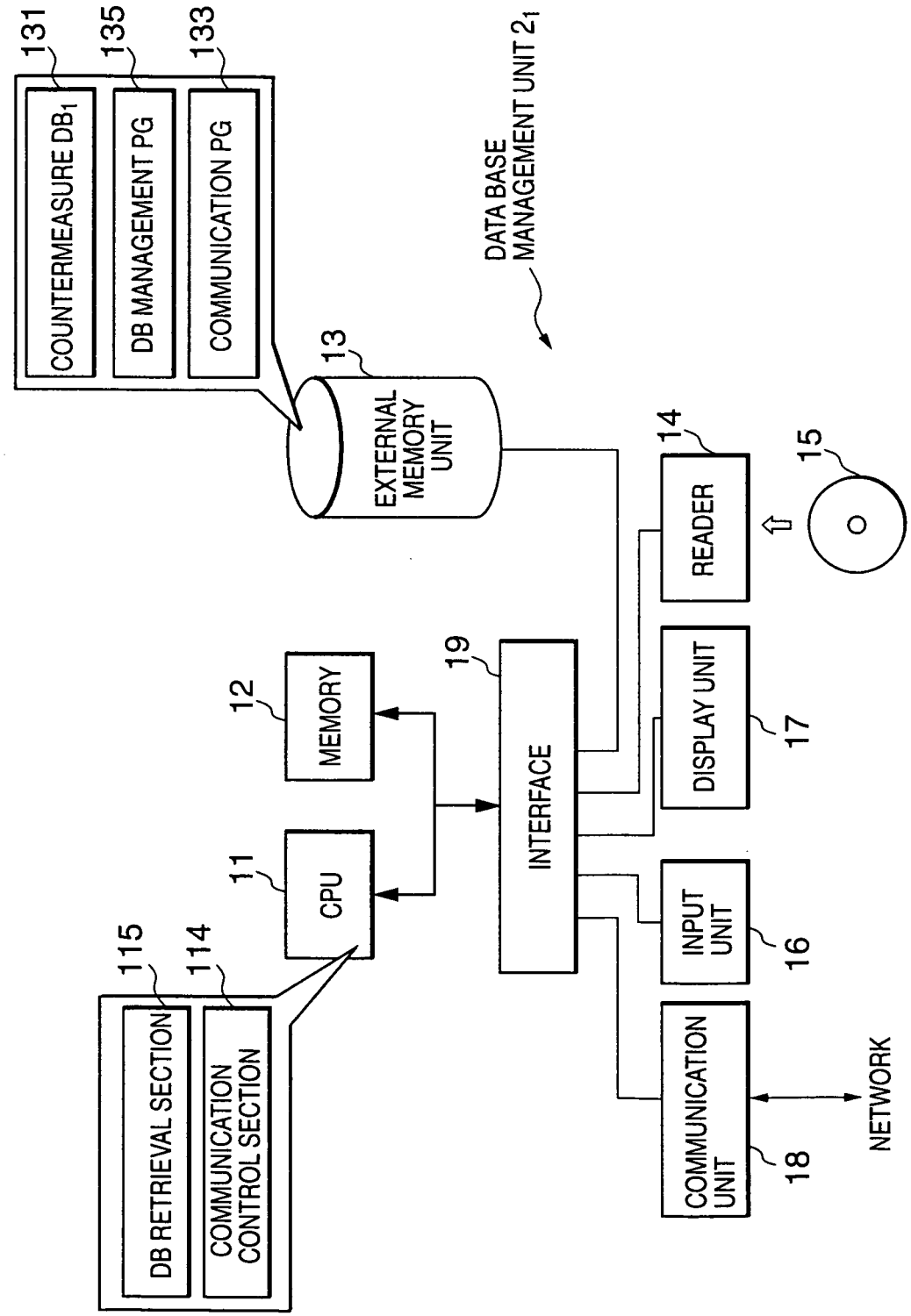
FIG. 19 is a schematic constitutional illustration of a database management unit $2_i$ ($1 \leq i \leq n$) used in the second preferred embodiment in accordance with the present invention.

FIG. 19 is a schematic constitutional illustration of the database management units $2_i$ ($1 \leq i \leq n$) used in the second preferred embodiment in accordance with the present invention. Here, parts having the same functions as the security support and evaluation apparatus 1 used in the first preferred embodiment in accordance with the present invention shown in FIG. 1 have the same reference numerals.

As shown in FIG. 19, the database management units $2_i$ of the present preferred embodiment is different from the security support and evaluation apparatus 1 shown in FIG. 17 in that a security countermeasure database $DB_i$ 131 and a database management program PG 135 are stored in an external storage unit 13 instead of the database address management table 134 and an evaluation and construction support program PG 132. A CPU 11 loads the database management program PG 135 into a memory 12 and executes it so as to realize, as a process, a database DB retrieval section 115 which reads out necessary information from the security countermeasure database $DB_i$ 131 stored in the external storage unit 13 according to a request accepted from the security support and evaluation apparatus 1 via a communication control section 114 and sends the information to the security support and evaluation apparatus 1.

Next, the processing of the security support and evaluation system having the above-mentioned constitution will be described.

First, the action of the security support and evaluation apparatus 1 shown in FIG. 17 will be described.

The processing of the security support and evaluation apparatus 1 of the present preferred embodiment is basically similar to the action of the security support and evaluation apparatus 1 of the first preferred embodiment shown in FIG. 6 and FIG. 7. However, they are different from each other in the following points:

That is, in the step S1001, the security support and evaluation apparatus 1 previously stores, for example, in the external storage unit 13, the names of objective systems of the security countermeasure databases $DB_1$ to $DB_n$ 131 stored by the database management units $2_1$ to $2_n$ and a countermeasure list making section 111 reads out the name of each objective system of the security countermeasure databases $DB_1$ to $DB_n$ 131 from the external storage unit 13 and displays the GUI screen shown in FIG. 8 by the use of the input/output control section 113.

Also, in the step S1003, the countermeasure list making section 111 passes a command for reading out the names of the constituent components of the system selected in the step S1002 from the database management unit $2_i$ storing the security countermeasure database of the system to a communication control section 114. When the communication control section 114 receives the command, it gets the address of the database management unit $2_i$ from the database address management table 134 stored in the external storage unit 13 and sends the command to the database management unit $2_i$ via a communication-unit 18. Then, when the communication control section 114 receives the names of the constituent components of the system from the database management unit $2_i$, it passes the names to the countermeasure list making section 111. When the countermeasure list making section 111 receives the names, it displays the GUI screen including the list of the accepted names of the constituent components, as shown in FIG. 9, by the use of the input/output control section 113.

Figure 20:
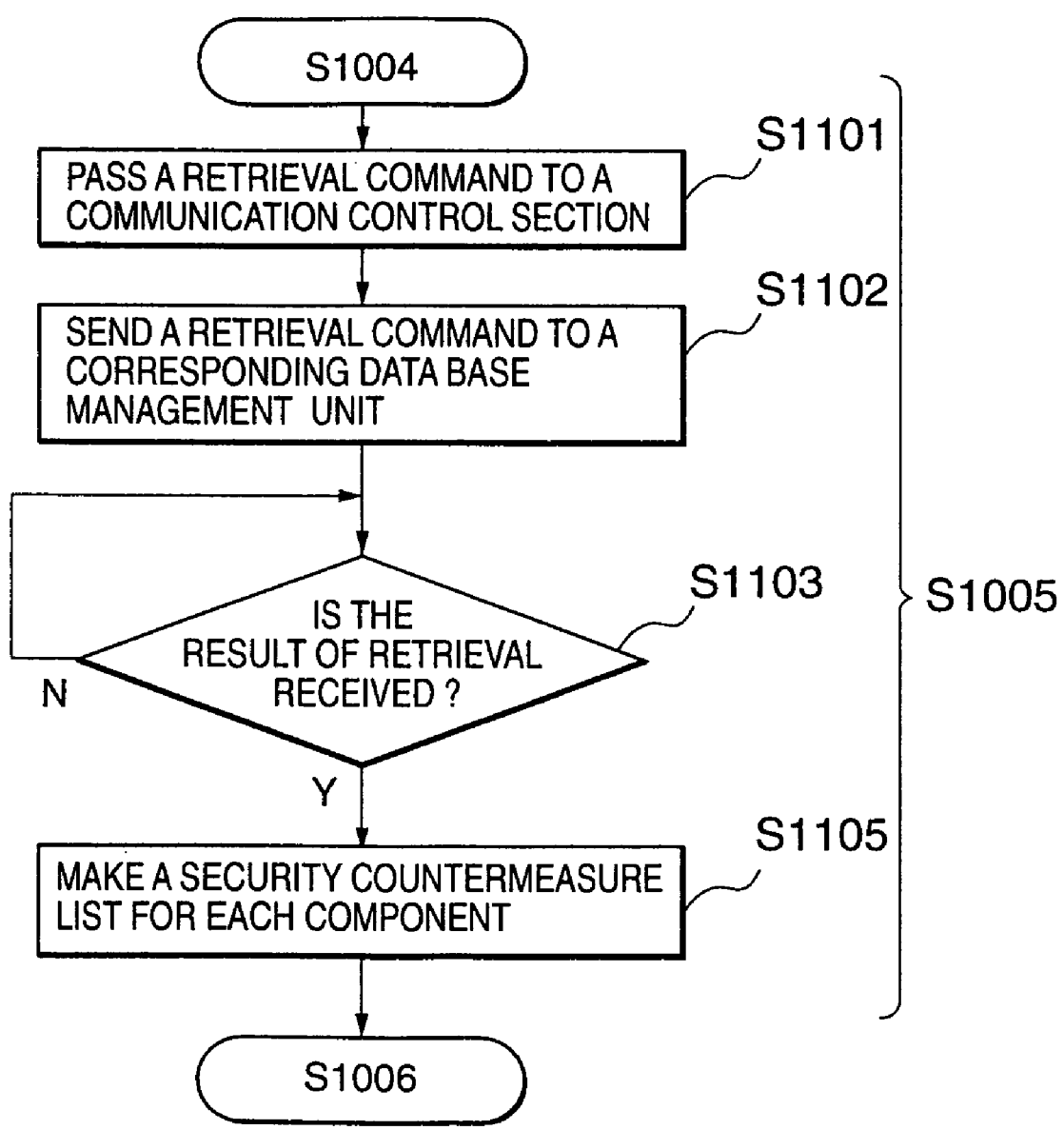
FIG. 20 is a flow chart for explaining the processing of a step S1005 in FIG. 6 in a security support and evaluation apparatus 1 used in the second preferred embodiment in accordance with the present invention.

Further, a processing shown in FIG. 20 is executed in the step S1005.

First, the countermeasure list making section 111 passes a retrieval command for reading out necessary information from the database management unit $2_i$ storing the security countermeasure database of the system selected in the step S1002 to the communication control section 114 with the contents of the items checked by the operator via the GUI screen shown in FIG. 9 in the step S1004 (step S1101).

When the communication control section 114 receives the retrieval command, it gets the address of the database management unit $2_i$ from the database address management table 134 stored in the external storage unit 13 and sends the retrieval command of the database including the contents of the above-mentioned checked items to the database management unit $2_i$ via the communication unit 18 (step S1102). Then, when the communication control section 114 receives the results of retrieval from the database management unit $2_i$ (step S1103), it passes them to the countermeasure list making section 111.

When the countermeasure list making section 111 receives the results of retrieval, it makes a security countermeasure lists for each of the components checked in the item of "constitution of component" 801 in the GUI screen shown in FIG. 9 and for each of the environments checked in the item of "environment" 802 based on the results of retrieval (step S1104).

Next, the process of the database management unit $2_i$ shown in FIG. 19 will be described.

Figure 21:
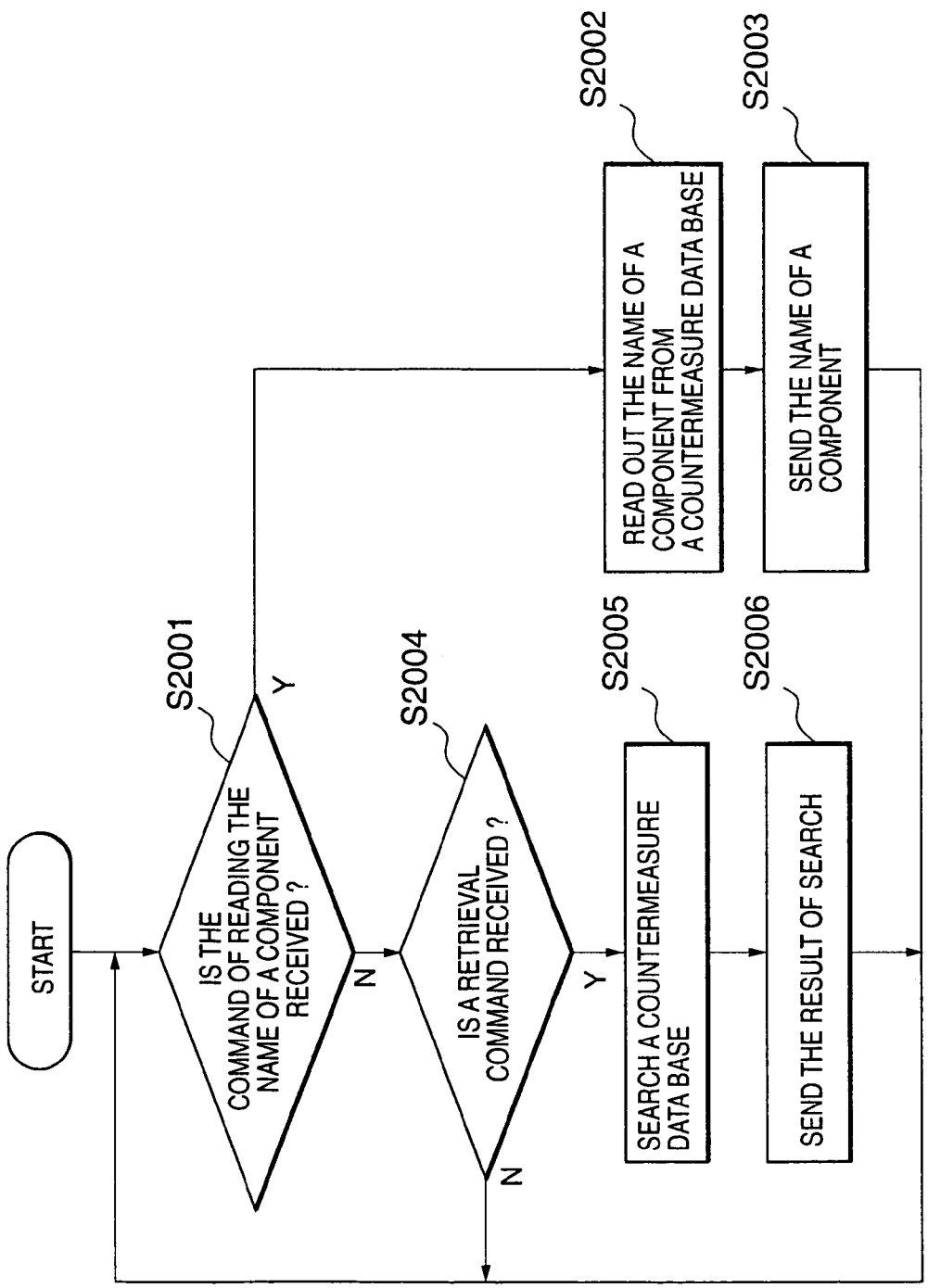
FIG. 21 is a flow chart for explaining the processing of a database management unit $2_i$ ($1 \leq i \leq n$) used in the second preferred embodiment in accordance with the present invention.

FIG. 21 is a flow chart to explain the process of the database management unit $2_i$ used in the second preferred embodiment in accordance with the present invention.

First, when the communication control section 114 receives a command for reading out the names of the constituent components of a system from the security support and evaluation apparatus 1 via the communication unit 18 (step S2001), it passes the command to a database retrieval section 115. When the database retrieval section 115 receives the names, it reads out the names of each of the constituent component described in the column 206 of the database from the security countermeasure database $DB_i$ stored in the external storage unit 13 (see FIG. 2 to FIG. 5) and passes them to the communication control section 114 (step S2002). The communication control section 114 sends the received names of each of the constituent components to the security support and evaluation apparatus 1 (step S2003).

Then, when the communication control section 114 receives the retrieval command including the names of the constituent components, the environments, and the security strength which are checked in the GUI screen shown in FIG. 9 from the security support and evaluation apparatus 1 via the communication unit 18 (step S2004), it passes the retrieval command to the database retrieval section 115. When the database retrieval section 115 receives the retrieval command, it reads out necessary information from the security countermeasure database $DB_i$ stored in the external storage unit 13 (step S2005).

For example, in the case where the security countermeasure database $DB_i$ stored in the external storage unit 13 is for an Internet connection system shown in FIG. 2 and FIG. 3 and where the names of the constituent components and the environment included in the retrieval command are "WWW server", "client", and "operation" and where the security strength is "normal", the database retrieval section 115 reads out the necessary information in the following way.

First, in the rows of the column $206_1$ of "WWW server" of the database of an Internet connection system shown in FIG. 2 and FIG. 3, attention must be paid to the rows in which it is described that the security countermeasure of the same row can be applied and that the security level ensured when the security countermeasure is applied is not higher than a security strength included in the retrieval command (here, "normal"=L1). Then, for the respective rows to which attention has been paid, the contents described in the column $206_1$ of the "WWW server" and the contents described in the columns 201 to 204 and $205_i$ are read out. The above-mentioned processing is executed in the similar way for the column $206_2$ of "client" and for the column 208 of "operation" to read out the necessary information for the constituent components and the environments included in the retrieval command.

Next, the database retrieval section 115 passes the information read out in the above-stated manner to the communication control section 114. The communication control section 114 sends the received information to the security support and evaluation apparatus 1 as the results of retrieval (step S2006).

Up to this point, the second preferred embodiment in accordance with the present invention has been described.

In the present preferred embodiment, the security countermeasure databases $DB_1$ to $DB_n$ 131 are stored in the database management units $2_1$ to $2_n$ constructed in the electronic computer other than the security support and evaluation apparatus 1 and the security support and evaluation apparatus 1 gets access to the database management units $2_i$ via the network such as the public network to obtain information necessary to make the security countermeasure lists. Therefore, the present preferred embodiment is very suitable in the case where the security support and evaluation apparatus 1 is constructed, for example, in a portable electronic computer.

In this connection, while the security support and evaluation apparatus 1 stores previously in the external storage unit 13 the names of each objective system of the security countermeasure databases $DB_1$ to $DB_n$ 131 stored by the database management units $2_1$ to $2_n$ in the above-mentioned preferred embodiment, the security support and evaluation apparatus 1 may periodically accesses each of the database management units $2_1$ to $2_n$ to get the information of the names. Also, in this case, if the security support and evaluation apparatus 1 may periodically gets the names of the constituent components of the objective system with the names of the objective systems of the security countermeasure database from the database management units $2_1$ to $2_n$, it is not necessary to change the step S1003 in FIG. 6.

As described above, according to the present invention, it is possible to evaluate the state of security of the system and to support the making of the security countermeasures without a high level of expertise.

What is claimed is:

1. A method for evaluating security applied to a system constituted by at least one component, by the use of an electronic computer, the method comprising steps of:
a first step of accepting a first specification of a system to be evaluated and a second specification of each of the components constituting the system, from an operator via an input unit connected to the electronic computer;
a second step of retrieving data from a database in which constituent components and security countermeasures to be executed to the constituent components are described for each type of system, and of reading out security countermeasures to be executed to the components constituting the system which are specified by the second specification, out of the constituent components of the system type, the system type corresponding to that of the system which is specified by the first specification;
a third step of displaying on a display unit connected to the electronic computer, the security countermeasures read out in the second step in correspondence with each of the components constituting the system which are specified by the second specification and of accepting from the operator via the input unit, information as to whether or not each of the security countermeasures being displayed is executed; and a fourth step of evaluating a state of security of the system, based on the information regarding whether the security countermeasures of the components constituting the system are executed or not, the information being accepted in the third step, and of displaying evaluation results on the display unit, wherein the database describes, as to each of the security countermeasures, a security type ensured by executing the security countermeasure concerned, and wherein the fourth step includes steps of:

classifying the security countermeasures, which are read out in the second step, into the security types;

determining, as to each of the security types, the ratio of the number of security countermeasures accepted as executed in the third step, to the number of security countermeasures classified into the security type concerned; and displaying on the display unit the ratio for each of the security types as the degree of accomplishment of the security countermeasures classified into the security type concerned.

2. A method for evaluating security applied to a system constituted by at least one component, by the use of an electronic computer, the method comprising steps of:

a first step of accepting a first specification of a system to be evaluated and a second specification of each of the components constituting the system, from an operator via an input unit connected to the electronic computer;

a second step of retrieving data from a database in which constituent components and security countermeasures to be executed to the constituent components are described for each type of system, and of reading out security countermeasures to be executed to the components constituting the system which are specified by the second specification, out of the constituent components of the system type, the system type corresponding to that of the system which is specified by the first specification;

a third step of displaying on a display unit connected to the electronic computer, the security countermeasures read out in the second step in correspondence with each of the components constituting the system which are specified by the second specification and of accepting from the operator via the input unit, information as to whether or not each of the security countermeasures being displayed is executed; and a fourth step of evaluating a state of security of the system, based on the information regarding whether the security countermeasures of the components constituting the system are executed or not, the information being accepted in the third step, and of displaying evaluation results on the display unit, wherein the database describes, as to each of the security countermeasures, a security type ensured and the degree of risk avoided, by executing the security countermeasure concerned, and wherein the fourth step includes steps of;

classifying the security countermeasures, which are read out in the second step, into the security types;

determining, as to each of the security types, the total sum of the degrees of risks corresponding to the security countermeasures accepted as non-executed in the third step, out of the security countermeasures classified into the security type concerned; and displaying on the display unit the total sum of the degrees of risks for each of the security types as the degree of the remaining risk of the security countermeasures classified into the respective security types.

3. A method for evaluating security applied to a system constituted by at least one component, by the use of an electronic computer, the method comprising steps of:

a first step of accepting a first specification of a system to be evaluated and a second specification of each of the components constituting the system, from an operator via an input unit connected to the electronic computer;

a second step of retrieving data from a database in which constituent components and security countermeasures to be executed to the constituent components are described for each type of system, and of reading out security countermeasures to be executed to the components constituting the system which are specified by the second specification, out of the constituent components of the system type, the system type corresponding to that of the system which is specified by the first specification;

a third step of displaying on a display unit connected to the electronic computer, the security countermeasures read out in the second step in correspondence with each of the components constituting the system which are specified by the second specification and of accepting from the operator via the input unit, information as to whether or not each of the security countermeasures being displayed is executed; and a fourth step of evaluating a state of security of the system, based on the information regarding whether the security countermeasures of the components constituting the system are executed or not, the information being accepted in the third step, and of displaying evaluation results on the display unit, wherein the database describes, as to each of the security countermeasures, a security type ensured and a cost required, by executing the security countermeasure concerned, and wherein the fourth step includes steps of:

classifying the security countermeasures, which are read out in the second step, into the security types;

determining, as to each of the security types, the total sum of the costs corresponding to the security countermeasures accepted as executed in the third step, out of the security countermeasures classified into the security type concerned; and displaying on the display unit, the total sum of the costs for each of the security types as the required cost of the security countermeasures classified into the security type concerned.

4. A storage medium in which a program for making an electronic computer evaluate security of a system constituted by at least one component is stored, the program making the electronic computer execute steps of:

a first step of accepting a first specification of a system to be evaluated and a second specification of each of the components constituting the system, from an operator via an input unit connected to the electronic computer;

a second step of retrieving data from a database in which constituent components and security countermeasures to be executed to the constituent components are described for each type of system, and of reading out security countermeasures to be executed to the components constituting the system which are specified by the second specification, out of the constituent components of the system type, the system type corresponding to that of the system which is specified by the first specification;

a third step of displaying on a display unit connected to the electronic computer, the security countermeasures read out in the second step in correspondence with each of the components constituting the system which are specified by the second specification and of accepting from the operator via the input unit information as to whether or not each of the security countermeasures being displayed is executed; and a fourth step of evaluating a state of security of the system, based on the information regarding whether the security countermeasures to the components constituting the system are executed or not, the information being accepted in the third step, and of displaying evaluation results on the display unit, wherein the database describes, as to each of the security countermeasures, a security type ensured by executing the security countermeasure concerned, and wherein the fourth step includes steps of:

classifying the security countermeasures, which are read out in the second step, into the security types;

determining, as to each of the security types, the ratio of the number of security countermeasures accepted as executed in the third step, to the number of security countermeasures classified into the security type concerned; and displaying on the display unit the ratio for each of the security types as the degree of accomplishment of the security countermeasures classified into the security type concerned.

5. A program for making an electronic computer evaluate security of a system constituted by at least one component, the program making the electronic computer execute steps of:

a first step of accepting a first specification of a system to be evaluated and a second specification of each of the components constituting the system, from an operator via an input unit connected to the electronic computer;

a second step of retrieving data from a database in which constituent components and security countermeasures to be executed to the constituent components are described for each type of system, and of reading out security countermeasures to be executed to the components constituting the system which are specified by the second specification, out of the constituent components of the system type, the system type corresponding to that of the system which is specified by the first specification;

a third step of displaying on a display unit connected to the electronic computer, the security countermeasures read out in the second step in correspondence with each of the components constituting the system which are by the second specification, and of accepting from the operator via the input unit, information as to whether or not each of the security countermeasures is executed; and a fourth step of evaluating a state of security of the system, based on the information regarding whether the security countermeasures to the components constituting the system are executed or not, the information being accepted in the third step, and of displaying evaluation results on the display unit wherein the database describes, as to each of the security countermeasures, a security type ensured by executing the security countermeasure concerned, and wherein the fourth step includes steps of:

classifying the security countermeasures, which are read out in the second step, into the security types:

determining, as to each of the security types, the ratio of the number of security countermeasures accepted as executed in the third step, to the number of security countermeasures classified into the security type concerned; and displaying on the display unit the ratio for each of the security types as the degree of accomplishment of the security countermeasures classified into the security type concerned.

6. A storage medium in which a program for making an electronic computer evaluate security of a system constituted by at least one component is stored, the program making the electronic computer execute steps of:

a first step of accepting a first specification of a system to be evaluated and a second specification of each of the components constituting the system, from an operator via an input unit connected to the electronic computer;

a second step of retrieving data from a database in which constituent components and security countermeasures to be executed to the constituent components are described for each type of system, and of reading out security countermeasures to be executed to the components constituting the system which are specified by the second specification, out of the constituent components of the system type, the system type corresponding to that of the system which is specified by the first specification;

a third step of displaying on a display unit connected to the electronic computer, the security countermeasures read out in the second step in correspondence with each of the components constituting the system which are specified by the second specification and of accepting from the operator via the input unit information as to whether or not each of the security countermeasures being displayed is executed; and a fourth step of evaluating a state of security of the system, based on the information regarding whether the security countermeasures to the components constituting the system are executed or not, the information being accepted in the third step, and of displaying evaluation results on the display unit, wherein the database describes, as to each of the security countermeasures, a security type ensured and the degree of risk avoided, by executing the security countermeasure concerned, and wherein the fourth step includes steps of;

classifying the security countermeasures, which are read out in the second step, into the security types;

determining, as to each of the security types, the total sum of the degrees of risks corresponding to the security countermeasures accepted as non-executed in the third step, out of the security countermeasures classified into the security type concerned; and displaying on the display unit the total sum of the degrees of risks for each of the security types as the degree of the remaining risk of the security countermeasures classified into the respective security types.

7. A program for making an electronic computer evaluate security of a system constituted by at least one component, the program making the electronic computer execute steps of:

a first step of accepting a first specification of a system to be evaluated and a second specification of each of the components constituting the system, from an operator via an input unit connected to the electronic computer;

a second step of retrieving data from a database in which constituent components and security countermeasures to be executed to the constituent components are described for each type of system, and of reading out security countermeasures to be executed to the components constituting the system which are specified by the second specification, out of the constituent components of the system type, the system type corresponding to that of the system which is specified by the first specification;

a third step of displaying on a display unit connected to the electronic computer, the security countermeasures read out in the second step in correspondence with each of the components constituting the system which are by the second specification, and of accepting from the operator via the input unit, information as to whether or not each of the security countermeasures is executed; and a fourth step of evaluating a state of security of the system, based on the information regarding whether the security countermeasures to the components constituting the system are executed or not, the information being accepted in the third step, and of displaying evaluation results on the display unit wherein the database describes, as to each of the security countermeasures, a security type ensured and the degree of risk avoided, by executing the security countermeasure concerned, and wherein the fourth step includes steps of;

classifying the security countermeasures, which are read out in the second step, into the security types;

determining, as to each of the security types, the total sum of the degrees of risks corresponding to the security countermeasures accepted as non-executed in the third step, out of the security countermeasures classified into the security type concerned; and displaying on the display unit the total sum of the degrees of risks for each of the security types as the degree of the remaining risk of the security countermeasures classified into the respective security types.

8. A program for making an electronic computer evaluate security of a system constituted by at least one component, the program making the electronic computer execute steps of:

a first step of accepting a first specification of a system to be evaluated and a second specification of each of the components constituting the system, from an operator via an input unit connected to the electronic computer;

a second step of retrieving data from a database in which constituent components and security countermeasures to be executed to the constituent components are described for each type of system, and of reading out security countermeasures to be executed to the components constituting the system which are specified by the second specification, out of the constituent components of the system type, the system type corresponding to that of the system which is specified by the first specification;

a third step of displaying on a display unit connected to the electronic computer, the security countermeasures read out in the second step in correspondence with each of the components constituting the system which are by the second specification, and of accepting from the operator via the input unit, information as to whether or not each of the security countermeasures is executed; and a fourth step of evaluating a state of security of the system, based on the information regarding whether the security countermeasures to the components constituting the system are executed or not, the information being accepted in the third step, and of displaying evaluation results on the display unit wherein the database describes, as to each of the security countermeasures, a security type ensured and a cost required, by executing the security countermeasure concerned, and wherein the fourth step includes steps of:

classifying the security countermeasures, which are read out in the second step, into the security types;

determining, as to each of the security types, the total sum of the costs corresponding to the security countermeasures accepted as executed in the third step, out of the security countermeasures classified into the security type concerned; and displaying on the display unit, the total sum of the costs for each of the security types as the required cost of the security countermeasures classified into the security type concerned.

* * * * *